US011322805B2

(12) United States Patent
Motohashi et al.

(10) Patent No.: US 11,322,805 B2
(45) Date of Patent: May 3, 2022

(54) METHOD OF MANUFACTURING BATTERY PACK AND BATTERY PACK

(71) Applicant: Marelli Corporation, Saitama (JP)

(72) Inventors: Toshiyuki Motohashi, Saitama (JP); Takayuki Hirase, Saitama (JP)

(73) Assignee: Marelli Corporation, Saitama (JP)

( * ) Notice: Subject to any disclaimer, the term of this patent is extended or adjusted under 35 U.S.C. 154(b) by 0 days.

(21) Appl. No.: 16/753,519

(22) PCT Filed: Oct. 2, 2018

(86) PCT No.: PCT/JP2018/036855
§ 371 (c)(1),
(2) Date: Apr. 3, 2020

(87) PCT Pub. No.: WO2019/069912
PCT Pub. Date: Apr. 11, 2019

(65) Prior Publication Data
US 2020/0321592 A1 Oct. 8, 2020

(30) Foreign Application Priority Data

Oct. 3, 2017 (JP) .............................. JP2017-193807

(51) Int. Cl.
H01M 50/531 (2021.01)
H01M 50/20 (2021.01)
(Continued)

(52) U.S. Cl.
CPC ..... *H01M 50/531* (2021.01); *H01M 10/0468* (2013.01); *H01M 50/172* (2021.01); *H01M 50/20* (2021.01); *H01M 2220/20* (2013.01)

(58) Field of Classification Search
CPC ... H01M 50/531; H01M 50/20; H01M 50/172
See application file for complete search history.

(56) References Cited

U.S. PATENT DOCUMENTS

2011/0250491 A1* 10/2011 Kim .................... H01M 10/052
429/176
2012/0141847 A1 6/2012 Amagai et al.
(Continued)

FOREIGN PATENT DOCUMENTS

EP 3220449 A1 9/2017
JP 2006164895 A 6/2006
(Continued)

OTHER PUBLICATIONS

International Preliminary Report on Patentability dated Apr. 8, 2020 of International Application No. PCT/JP2018/036855.
(Continued)

*Primary Examiner* — Kenneth J Douyette
(74) *Attorney, Agent, or Firm* — Young Basile Hanlon & MacFarlane, P.C.

(57) ABSTRACT

A method of manufacturing a battery pack including a plurality of battery cells that have electrode tabs protruding from an outer surface includes stacking the battery cells and housing the battery cells in a case so that the electrode tabs of adjacent battery cells are folded and overlap each other, and welding the electrode tabs together through a window of the case, the window being provided at a position opposite a folded and overlapping portion of the electrode tabs.

12 Claims, 17 Drawing Sheets

(51) Int. Cl.
*H01M 50/172* (2021.01)
*H01M 10/04* (2006.01)

(56) References Cited

U.S. PATENT DOCUMENTS

| | | | |
|---|---|---|---|
| 2013/0280571 A1* | 10/2013 | Eguchi | H01M 10/0525 |
| | | | 429/94 |
| 2014/0239904 A1* | 8/2014 | Tanaka | H01M 10/425 |
| | | | 320/128 |
| 2017/0331097 A1* | 11/2017 | Lee | B23K 26/21 |
| 2018/0047518 A1 | 2/2018 | Kuboki et al. | |

FOREIGN PATENT DOCUMENTS

| | | | |
|---|---|---|---|
| JP | 4877373 B2 | | 2/2012 |
| JP | 2016091607 A | | 5/2016 |
| WO | WO-2016-105169 A1 | * | 6/2016 |
| WO | 2016148222 A1 | | 9/2016 |

OTHER PUBLICATIONS

Office Action of corresponding application JP2017-193807; dated Oct. 30, 2018; 4 pages.

* cited by examiner

METHOD OF MANUFACTURING BATTERY PACK AND BATTERY PACK

CROSS-REFERENCE TO RELATED APPLICATION

The present application is a 371 of International Application Serial No. PCT/JP2018/036855, filed Oct. 2, 2018, which claims priority to and the benefit of Japanese Patent Application No. 2017-193807 filed Oct. 3, 2017, the entire contents of which are incorporated herein by reference.

TECHNICAL FIELD

The present disclosure relates to a method of manufacturing a battery pack and to a battery pack.

BACKGROUND

A chargeable/dischargeable battery module that includes a plurality of battery cells is known. For example, patent literature JP4877373B2 discloses stacking battery cells and joining the positive electrode tab and negative electrode tab of each battery cell to a bus bar by ultrasonic welding or the like.

SUMMARY

To prevent the tabs of each layer from interfering during ultrasonic welding when the tabs of the stacked battery cells are welded to the bus bar in JP4877373B2, the tabs are trimmed so as not to overlap in plan view. If the tabs of the battery cell are trimmed, however, then current collects at the remaining tip of the tab, increasing heat generation and possibly leading to shorter cell life.

In light of these considerations, the present disclosure aims to provide a method of manufacturing a battery pack and a battery pack that enable welding without trimming the tabs of battery cells.

To resolve the aforementioned problem, a method, according to an embodiment of the present disclosure, is for manufacturing a battery pack including a plurality of battery cells that have electrode tabs protruding from an outer surface, the method including:

- stacking the plurality of battery cells and housing the battery cells in a case so that the electrode tabs of adjacent battery cells are folded and overlap each other; and
- welding the electrode tabs together through a window of the case, the window being provided at a position opposite a folded and overlapping portion of the electrode tabs.

A battery pack according to an embodiment of the present disclosure includes:

- a plurality of battery cells having electrode tabs protruding from an outer surface; and
- a case housing the plurality of battery cells in a stacked state;
- wherein a welded portion is formed in the plurality of battery cells, the electrode tabs of adjacent battery cells being welded together in the welded portion in a folded and overlapping state; and
- wherein the case includes:
  - a housing portion configured to house the electrode tabs; and
  - a window configured to expose the welded portion from the housing portion.

The method of manufacturing a battery pack and the battery pack according to embodiments of the present disclosure enable welding without trimming the tabs of battery cells.

DETAILED DESCRIPTION

Embodiments of the present disclosure are described below with reference to the attached drawings. The front-back, left-right, and up-down directions in the description below take the directions of the arrows in the figures as a reference. The stacking direction of the plurality of battery cells 10 in the example below is the up-down direction, but this example is not limiting. The stacking direction of the plurality of battery cells 10 may match any other direction.

First Embodiment

Figure 1:
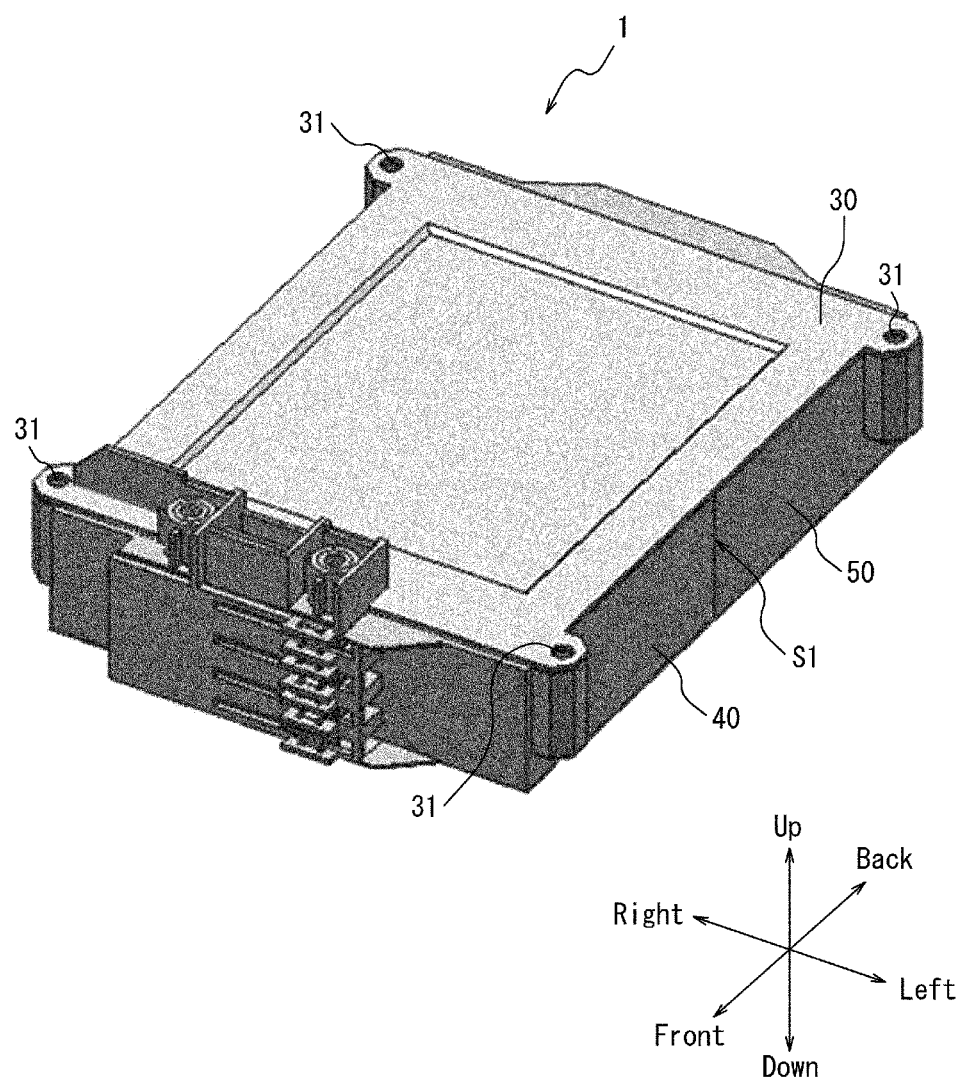
FIG. 1 is a perspective view illustrating the appearance of a battery pack according to a first embodiment of the present disclosure.
Figure 2:
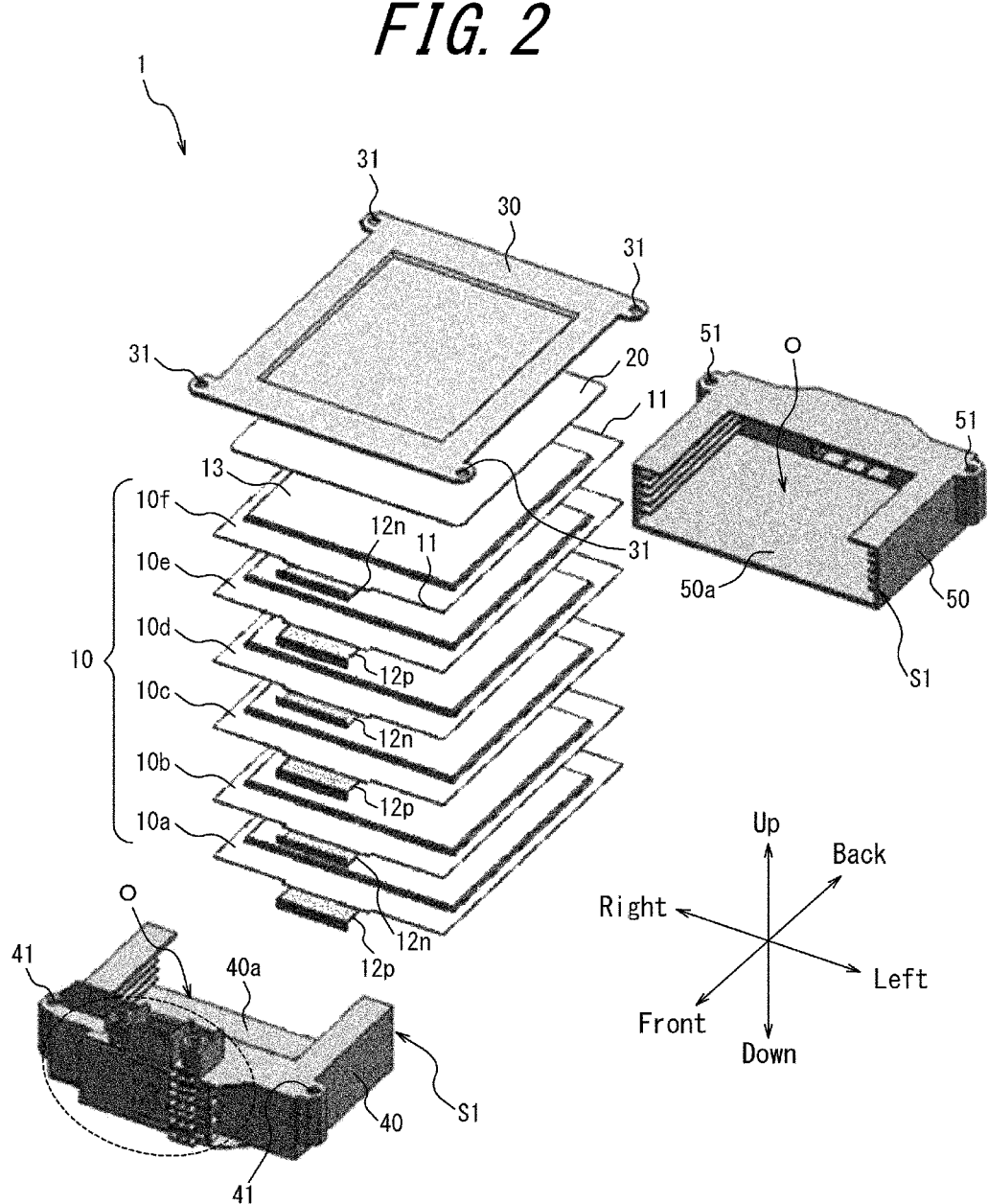
FIG. 2 is an exploded perspective view of each component inside the battery pack in FIG. 1.

FIG. 1 is a perspective view illustrating the appearance of a battery pack 1 according to a first embodiment of the present disclosure. FIG. 2 is an exploded perspective view of each component inside the battery pack 1 illustrated in FIG. 1. The battery pack 1 includes six battery cells 10, an insulating sheet 20, a restraining plate 30, a first case 40, and a second case 50 as major constituent elements.

The six battery cells 10 are stacked in the up-down direction. The six stacked battery cells 10 are referred to below as the battery cells 10a, 10b, 10c, 10d, 10e, 10f in order from bottom to top. The battery cells are referred to collectively as battery cells 10 when no distinction therebetween is made. Each battery cell 10 has two outer surfaces 11 formed by a front surface and a back surface that are substantially parallel in the up-down direction. Each battery cell 10 has one pair of electrode tabs 12p and 12n that protrude in opposite directions from the two outer surfaces 11 in a direction substantially perpendicular to the stacking direction, in particular in the front-back direction. Each battery cell 10 is stacked with the pair of electrode tabs 12p and 12n aligned in the front-back direction.

The insulating sheet 20 is formed as a substantially flat plate by an electrically insulating material such as polyethylene (PE) or polypropylene (PP) resin. The insulating sheet 20 is disposed to abut against the upper surface of the battery cell 10f positioned at the top of the stacked battery cells 10. The insulating sheet 20 is provided to secure electrical insulation between the restraining plate 30 abutting against the upper surface of the battery pack 1 and the battery cells 10 inside the battery pack 1.

The restraining plate 30 is disposed to abut against the upper surface of the insulating sheet 20. The restraining plate 30 is fixed to the upper surfaces of the engaged first case 40 and second case 50 by a suitable method, such as screwing. For example, the restraining plate 30 is fixed to the top of the engaged first case 40 and second case 50 by screwing screws into hole portions 31 provided at the four corners of the restraining plate 30 and aligned with two screw holes 41 provided at the left and right front edges of the first case 40 and two screw holes 51 provided at the left and right back edges of the second case 50. The restraining plate 30 clamps the battery cells 10 to the first case 40 and the second case 50 in a state that restrains outer surfaces 13 that are formed by the upper and lower surfaces of the battery cells 10 and that are perpendicular to the stacking direction. At the same time, the restraining plates 30 support the battery cells 10.

The first case 40 and the second case 50 engage with each other to support the stacked battery cells 10 therein. In other words, the stacked battery cells 10 are mounted on a bottom surface 40a of the first case 40 and a bottom surface 50a of the second case 50. When engaged, the first case 40 and the second case 50 have an opening O formed on the top surface opposite the bottom surface. Connection surfaces S1 of the first case 40 and the second case 50 that are connected to each other are substantially parallel to the outer surfaces 11 of the battery cells 10 on the electrode tab 12p or 12n side. In other words, the connection surfaces S1 are parallel to the up-down direction. In this way, the first case 40 and the second case 50 engage or separate in the protruding direction of the electrode tabs 12p and 12n of the battery cells 10.

Among the stacked battery cells 10, adjacent battery cells 10 may be adhesively fixed to each other by an adhesive such as a bonding agent or double-sided tape. For example, adjacent battery cells 10 may be adhesively fixed to each other by any method, such as applying a bonding agent to the upper surface of each battery cell 10. Similarly, the battery cell 10f and the insulating sheet 20 may be adhesively fixed to each other by adhesive. Furthermore, the insulating sheet 20 and restraining plate 30 may similarly be adhesively fixed to each other by adhesive.

Figure 3A:
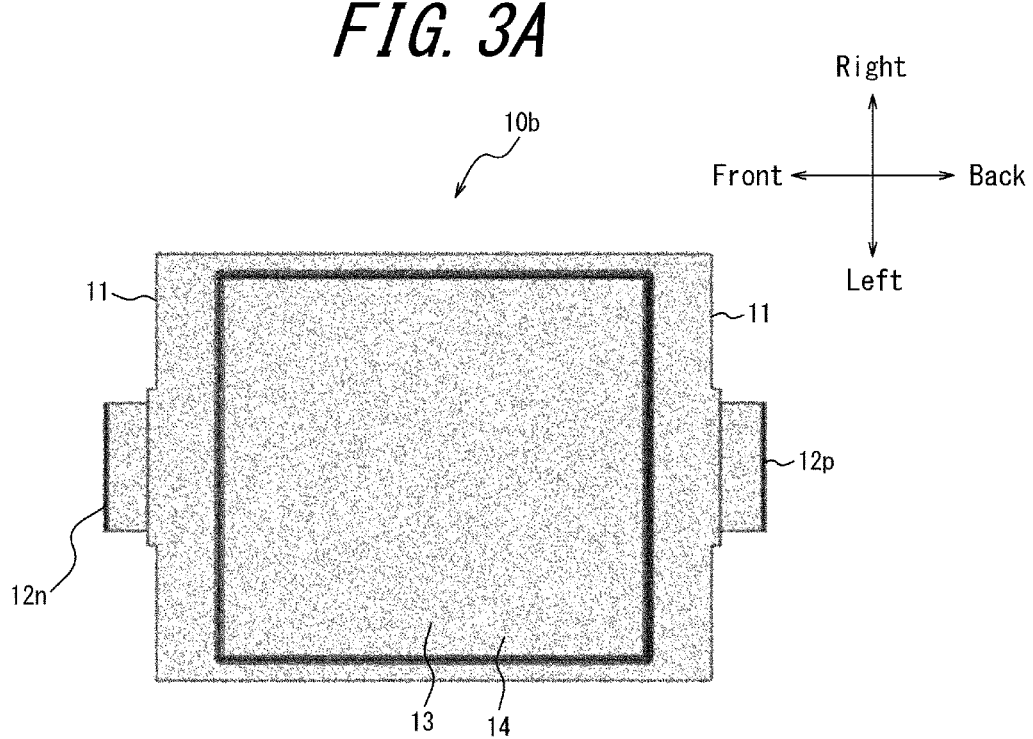
FIG. 3A is a top view of only the battery cell of FIG. 2.
Figure 3B:
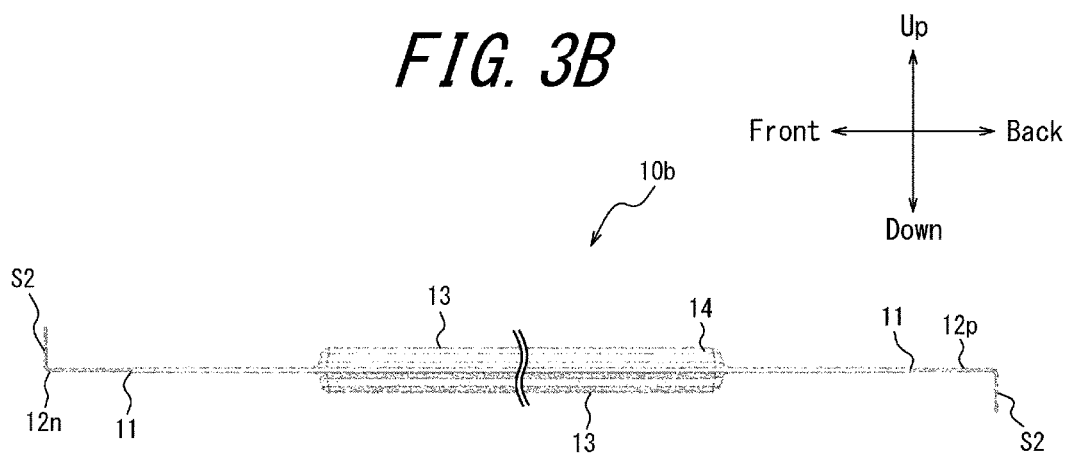
FIG. 3B is a side view of only the battery cell of FIG. 2.

FIGS. 3A and 3B illustrate only the battery cell 10 of FIG. 2. FIG. 3A is a top view of the battery cell 10. FIG. 3B is a side view of the battery cell 10. As an example, FIGS. 3A and 3B illustrate the battery cell 10b disposed as in FIG. 2. The other battery cells 10 are also configured similarly to the battery cell 10b illustrated in FIGS. 3A and 3B.

The battery cell 10 is formed as a substantially flat plate when viewed from the top. An exterior member 14 of the battery cell 10 is formed by a laminated film. The outermost layer of the exterior member 14 is made of resin to secure electrical insulation. The upper and lower surfaces of the exterior member 14 form the outer surfaces 13. The outer surfaces 11 protrude one step farther outward in the central region than at the left and right edges. In other words, the outer surfaces 11 are formed to be convex when viewed from the top. The electrode tab 12p or 12n protrudes from the portion of the outer surface 11 that protrudes one step outward. The electrode tabs 12p and 12n normally protrude as a flat plate but are symmetrically bent towards the outside to be substantially L-shaped, when viewed from the side, in order to contact the electrode tab of another battery cell 10 and the like adjacent in the up-down direction. For example, the electrode tab 12p is caused to protrude linearly outward along the front-back direction and is then bent downwards. In other words, the electrode tab 12p is formed to have a tip bent downwards. The electrode tab 12n is caused to protrude linearly outward along the front-back direction and is then bent upwards. In other words, the electrode tab 12n is formed to have a tip bent upwards. In the example below, the electrode tab 12p bent downwards is a positive electrode terminal, and the electrode tab 12n bent upwards is a negative electrode terminal, but this example is not limiting. The electrode tabs 12p and 12n may be configured so that the positive electrode and negative electrode roles are reversed.

Figure 4A:
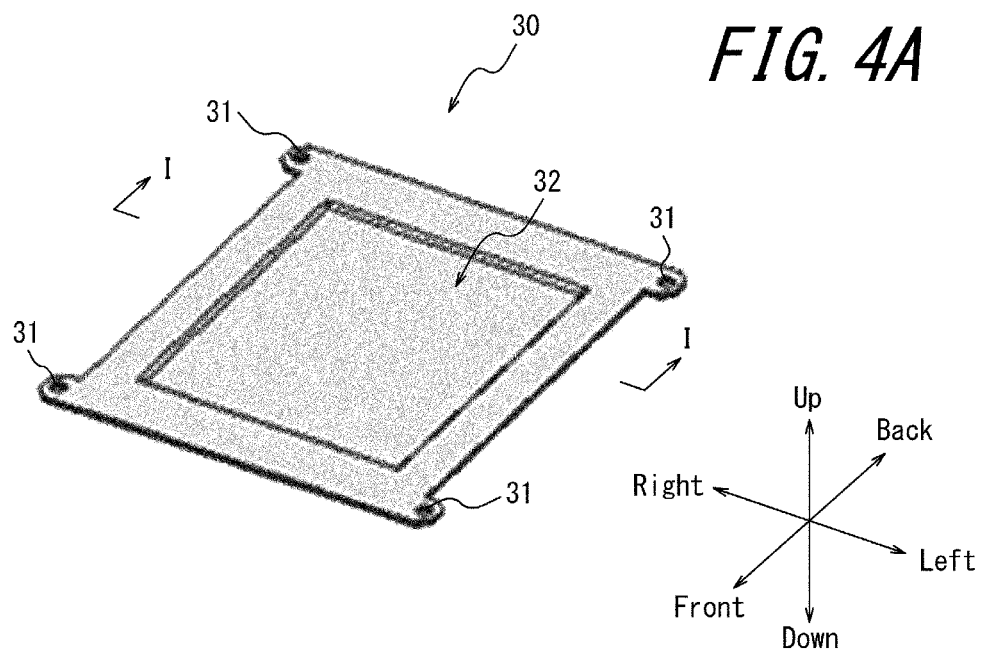
FIG. 4A illustrates only the restraining plate of FIG. 2.
Figure 4B:
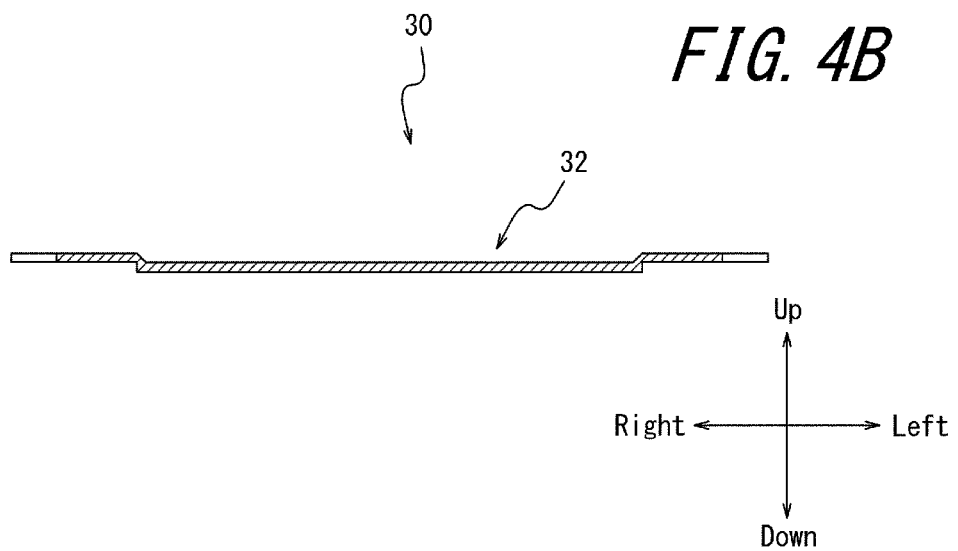
FIG. 4B is a cross-sectional view along the I-I line of FIG. 4A.

FIGS. 4A and 4B illustrate only the restraining plate 30 of FIG. 2. FIG. 4A is a perspective view, from the top, of the restraining plate 30. FIG. 4B is a cross-sectional view along the I-I line of FIG. 4A.

The restraining plate 30 is suitably made of any highly rigid material. For example, the restraining plate 30 is suitably made exclusively of a metal material. This example is not limiting, and the restraining plate 30 may be made of a resin material or a metal material provided with an electrically insulating material, such as PET resin, on the surface thereof. The restraining plate 30 is formed as a substantially flat plate. The restraining plate 30 has a substantially rectangular recess 32 formed at the substantially central region and recessed one step inward along the up-down direction. Four hole portions 31 protrude from the four corners of the outer edge of the restraining plate 30 that surrounds the recess 32. The surface of the recess 32 is, for example, formed linearly to be substantially parallel to the surface of the outer edge of the restraining plate 30. The surface of the recess 32 is not limited to this configuration and may, for example, be formed as a linear or curved surface that is inclined to protrude farther inward towards the central region thereof. The battery pack 1 can firmly fix the battery cells 10 therein by pressure from the recess 32. The restraining plate 30 is not limited to a configuration such as the recess 32. For example, the recess 32 may be omitted, and the restraining plate 30 may be formed so that the surface thereof is a linear or curved surface inclined to protrude gradually inward from the outer edge towards the central region thereof. Instead of the recess 32, the restraining plate 30 may have at least one rib that protrudes from the lower surface in the central region, for example.

Figure 5A:
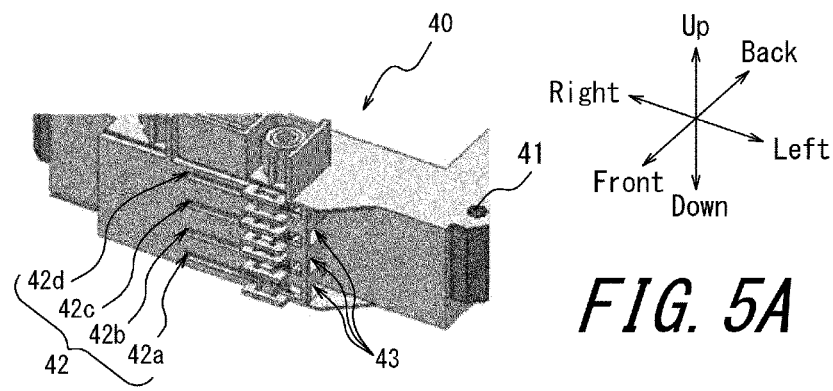
FIG. 5A is a perspective view, from the top, illustrating an enlargement of a portion of the front surface of only the first case of FIG. 2.
Figure 5B:
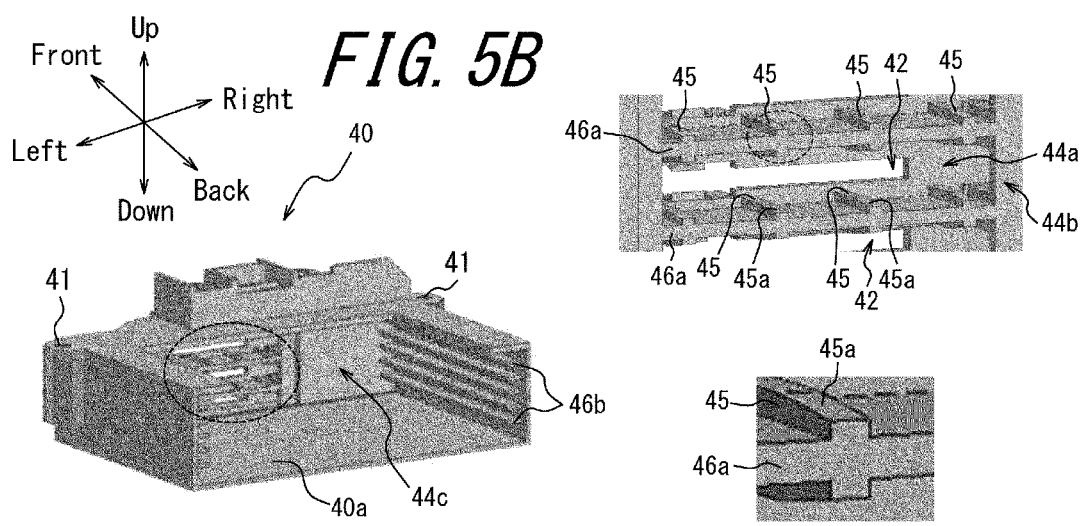
FIG. 5B is a perspective view from the back of only the first case of FIG. 2 and illustrates an enlargement of two portions surrounded by a dashed line.
Figure 5C:
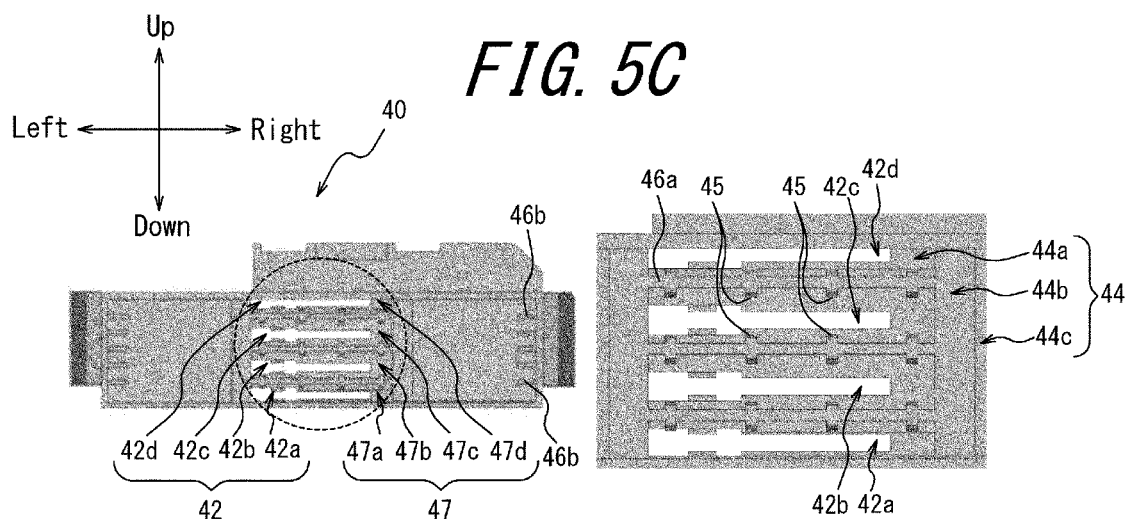
FIG. 5C is a back view of only the first case of FIG. 2 and illustrates an enlargement of the portion thereof surrounded by a dashed line.

FIGS. 5A through 5C illustrate only the first case 40 of FIG. 2. FIG. 5A is a perspective view, from the top, illustrating an enlargement of a portion of the front surface of the first case 40. FIG. 5B is a perspective view from the back of the first case 40 and illustrates an enlargement of two portions surrounded by a dashed line. FIG. 5C is a back view of the first case 40 and illustrates an enlargement of the portion thereof surrounded by a dashed line.

The first case 40 is made of a resin material or a metal material provided with an electrically insulating material, such as PET resin, on the surface thereof. The first case 40 may be made of any highly rigid material. The central region on the front surface of the first case 40 is formed to protrude one step outward. Four substantially rectangular windows 42 that penetrate through the front surface extend in the left-right direction in the central region of the front surface. One half of each window 42 in the left-right direction is formed to be wider in the up-down direction than the other half. Each window 42 is formed to be smaller than a tip surface S2 of the electrode tabs 12p and 12n of the battery cell 10. The tip surface S2 of the electrode tabs 12p and 12n is the outer surface of the portion of each tab bent in the up-down direction (see FIG. 3B). The four windows 42 are arranged in a line in the up-down direction so that the positions of the left and right ends and the positions of the wide halves in the left-right direction are aligned. Pressing member insertion holes 43 are formed on the left and right side surfaces of the central region on the front surface of the first case 40. The pressing member insertion holes 43 expose the inside of the first case 40 from the sides. A pair of pressing member insertion holes 43 is formed in correspondence with each of the four windows 42 at substantially the same height position as each window 42. In other words, the pressing member insertion holes 43 of each pair are formed to be at substantially the same height position on the left and right sides of the front central region of the first case 40.

The first case 40 includes an abutting portion 44 against which the outer surface 11 of the battery cell 10, or the electrode tab 12p or 12n protruding from the outer surface 11, abuts. The abutting portion 44 is, for example, suitably configured by a first inner wall 44a of the first case 40 faced by the electrode tab 12p or 12n of the battery cell 10 when the battery cell 10 is inserted into the first case 40. In other words, the first inner wall 44a is configured by the surface on which the windows 42 are formed within the back surface of the front central region of the first case 40. In this case, the tip surface S2 of the electrode tab 12p or 12n abuts against the first inner wall 44a when the six battery cells 10 are inserted in the first case 40.

The first case 40 includes a second inner wall 44b positioned at the back side of the pressing member insertion holes 43 and formed one step inward from the first inner wall 44a. The abutting portion 44 may be configured by the second inner wall 44b. In this case, when the six battery cells 10 are inserted in the first case 40, the central region protruding one step farther outward than at the left and right edges on the outer surface 11 abuts against the second inner wall 44b.

The first case 40 includes a third inner wall 44c formed one step farther inward than the second inner wall 44b. The abutting portion 44 may be configured by the third inner wall 44c. In this case, when the six battery cells 10 are inserted in the first case 40, the left and right edges that are recessed one step farther inward than the central region on the outer surface 11 abut against the third inner wall 44c.

In this way, each battery cell 10 is positioned by abutting the corresponding portions against the abutting portion 44 of the first case 40, using the electrode tab 12p or 12n, or the outer surface 11, as a reference. The abutting portion 44 is positioned near the windows 42. In greater detail, the abutting portion 44 is formed in the first case 40 to be at the same position on the front edge as the front central region where the windows 42 are formed. This configuration enables accurate positioning in the battery pack 1 when the electrode tabs 12p and 12n of adjacent battery cells 10 are welded together.

The first case 40 further includes guides 45, protruding inward from the first inner wall 44a, that guide the electrode tab 12p or 12n towards the first inner wall 44a when the battery cell 10 is inserted. At least one guide 45 is provided to protrude from the first inner wall 44a. The first case 40 further includes first insulating portions 46a, protruding inward from the first inner wall 44a, for electrically insulating electrode tabs 12p and 12n that are adjacent in the stacking direction of the battery cells 10 from each other. A total of three first insulating portions 46a are provided, one between each of the four windows 42. The front-back position of the back end of the first insulating portions 46a is the same as the second inner wall 44b. In other words, the back surface of the first insulating portions 46a and the second inner wall 44b are coplanar.

Each guide 45 extends along the front-back direction on the upper and lower surfaces of the first insulating portions 46a and protrudes in the up-down direction. For example, four guides 45 are provided on the upper surface of each first insulating portion 46a. These guides 45 are suitably separated in the left-right direction at equal intervals. Similarly, four guides 45 are provided on the lower surface of each first insulating portion 46a. These guides 45 are suitably separated in the left-right direction at equal intervals. The guides 45 formed on the upper and lower surfaces of the first insulating portions 46a may be disposed at the same positions or different positions in the left-right direction.

The guide 45 may include a tapered portion 45a that is tapered in the direction moving inward from the first inner wall 44a. For example, the amount of protrusion from the first insulating portion 46a may be constant in the first half of the guide 45 and then gradually decrease, starting at the substantially central area, towards the inside in the second half of the guide 45. The tapered shape of the tapered portion 45a may, for example, be linear or be a gradual curve. In this way, the separation width between adjacent guides 45 separated in the up-down direction increases towards the inside. This configuration of the tapered portion 45a enables the battery pack 1 to further improve the ease of insertion of the battery cells 10 into the first case 40.

The first case 40 includes four housing portions 47 therein. The back portion of the front central region, which protrudes one step outward, is divided in the up-down direction into the four housing portions 47 by the three first insulating portions 46a. In other words, each housing portion 47 houses the electrode tabs 12p and 12n arranged at the corresponding position in the up-down direction. The four housing portions 47 are referred to below as the housing portions 47a, 47b, 47c, and 47d in order from bottom to top. The housing portions are referred to collectively as housing portions 47 when no distinction therebetween is made. One window 42 is disposed at the front end of each of the housing portions 47a to 47d.

The first case 40 includes second insulating portions 46b protruding inward from the inner surface at both sides in the left-right direction. The second insulating portions 46b insulate adjacent battery cells 10 from each other when the battery cells 10 are stacked. Battery cells 10 that are adjacent when stacked are insulated from each other. A total of five second insulating portions 46b are provided, for example, one between each of the six stacked battery cells 10. The second insulating portions 46b are, for example, lined up in the stacking direction of the six battery cells 10, i.e. the up-down direction, at the same front-back position and with the same front-back width. The second insulating portions 46b also function as guides when the battery cells 10 are inserted into the first case 40.

Figure 6A:
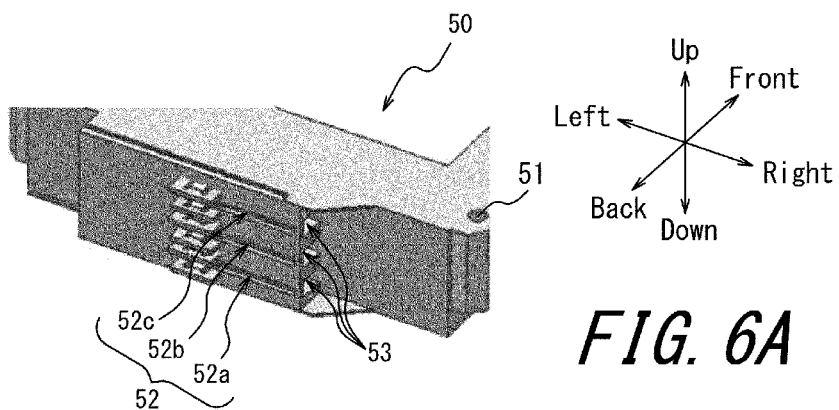
FIG. 6A is a perspective view, from the top, illustrating an enlargement of a portion of the back surface of only the second case of FIG. 2.
Figure 6B:
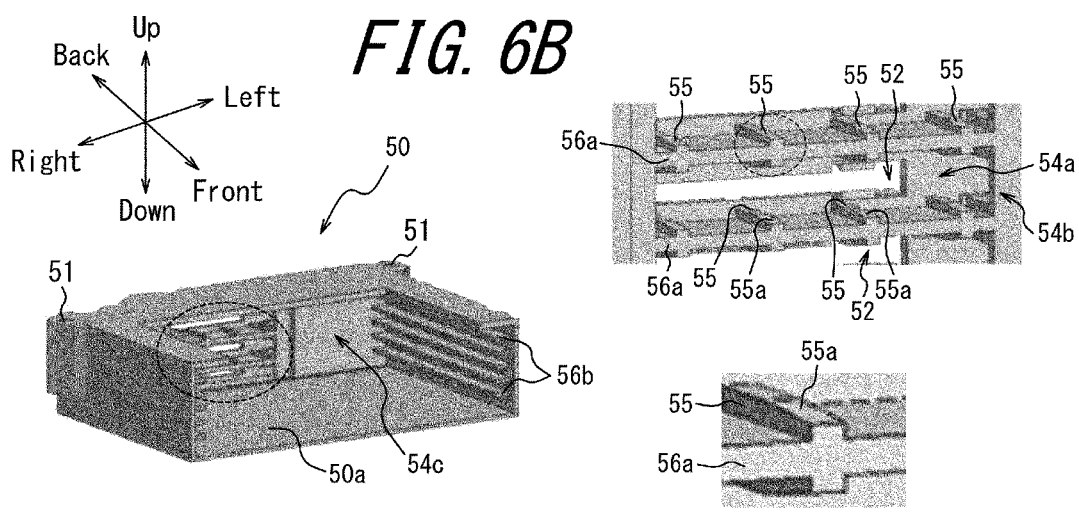
FIG. 6B is a perspective view from the back of only the second case of FIG. 2 and illustrates an enlargement of two portions surrounded by a dashed line.
Figure 6C:
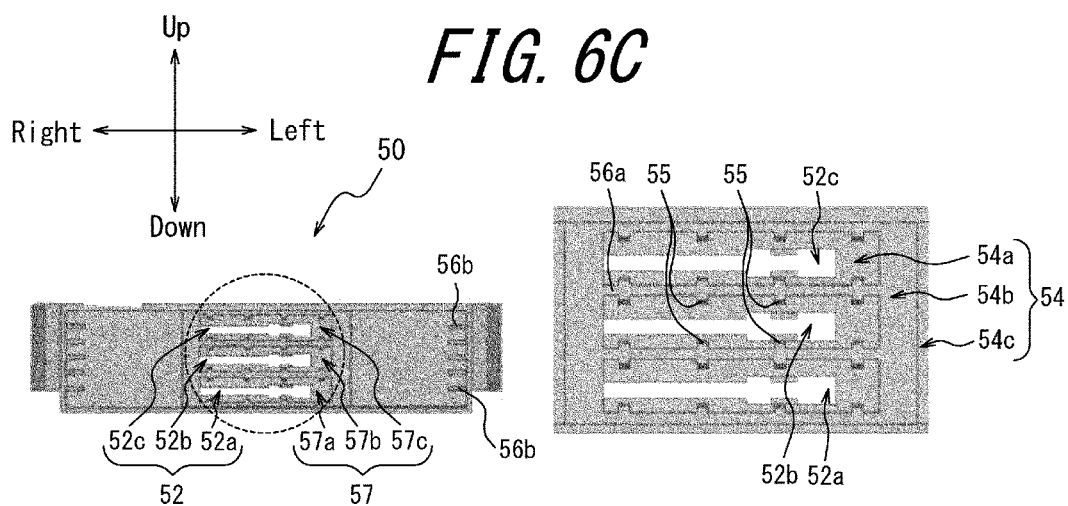
FIG. 6C is a back view of only the second case of FIG. 2 and illustrates an enlargement of the portion thereof surrounded by a dashed line.

FIGS. 6A through 6C illustrate only the second case 50 of FIG. 2. FIG. 6A is a perspective view, from the top, illustrating an enlargement of a portion of the back surface of the second case 50. FIG. 6B is a perspective view from the back of the second case 50 and illustrates an enlargement of two portions surrounded by a dashed line. FIG. 6C is a back view of the second case 50 and illustrates an enlargement of the portion thereof surrounded by a dashed line.

The second case 50 is configured similarly to the first case 40 and includes screw holes 51, windows 52, pressing member insertion holes 53, a first inner wall 54a, a second inner wall 54b, a third inner wall 54c, guides 55, tapered portions 55a, first insulating portions 56a, second insulating portions 56b, and housing portions 57. The above explanation of the first case 40 similarly applies to the corresponding components of the second case 50. The second case 50 is described below, focusing on the differences from the first case 40.

Three windows 52 in the second case 50 are formed to be located in the up-down direction between the corresponding windows 42 of the first case 40. In greater detail, the four windows 42 are referred to as windows 42a, 42b, 42c, and 42d in order from bottom to top, and the three windows 52 are referred to as windows 52a, 52b, and 52c in order from bottom to top. In this case, the window 52a is positioned between the window 42a and the window 42b in the up-down direction. The window 52b is positioned between the window 42b and the window 42c in the up-down direction. The window 52c is positioned between the window 42c and the window 42d in the up-down direction.

For example, the wide halves of the windows 52 may be formed on the same side in the left-right direction as the wide halves of the windows 42. In other words, when the wide halves of the windows 42 are formed on the left side, for example, as illustrated in FIGS. 5A to 5C, the wide halves of the windows 52 may be formed on the left side, as illustrated in FIGS. 6A to 6C.

A total of two first insulating portions 56a are provided, one between each of the three windows 52. The back portion of the back central region, which protrudes one step outward, is divided in the up-down direction into three housing portions 57 by the two first insulating portions 56a. In other words, each housing portion 57 houses the electrode tabs 12p and 12n arranged at the corresponding position in the up-down direction. The three housing portions 57 are referred to below as the housing portions 57a, 57b, and 57c in order from bottom to top. The housing portions are referred to collectively as housing portions 57 when no distinction therebetween is made. The guides 55 are similarly provided on the bottom surface of the housing portion 57a and the ceiling surface of the housing portion 57c. For example, four guides 55 are provided on these surfaces.

Figure 8A:
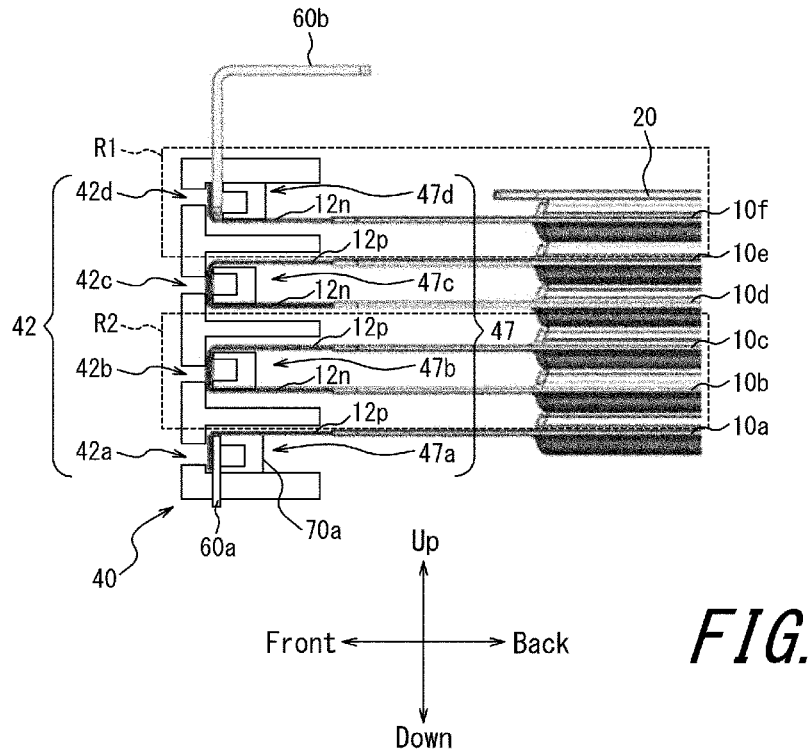
FIG. 8A is a schematic diagram illustrating the inside of the first case at the time of the third step of FIG. 7C.
Figure 8B:
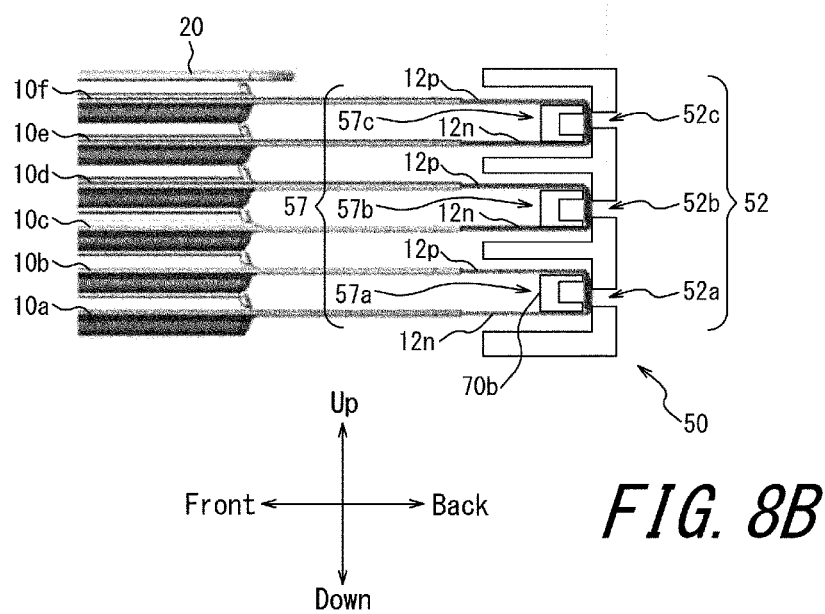
FIG. 8B is a schematic diagram illustrating the inside of the second case at the time of the fourth step of FIG. 7D.
Figure 9A:
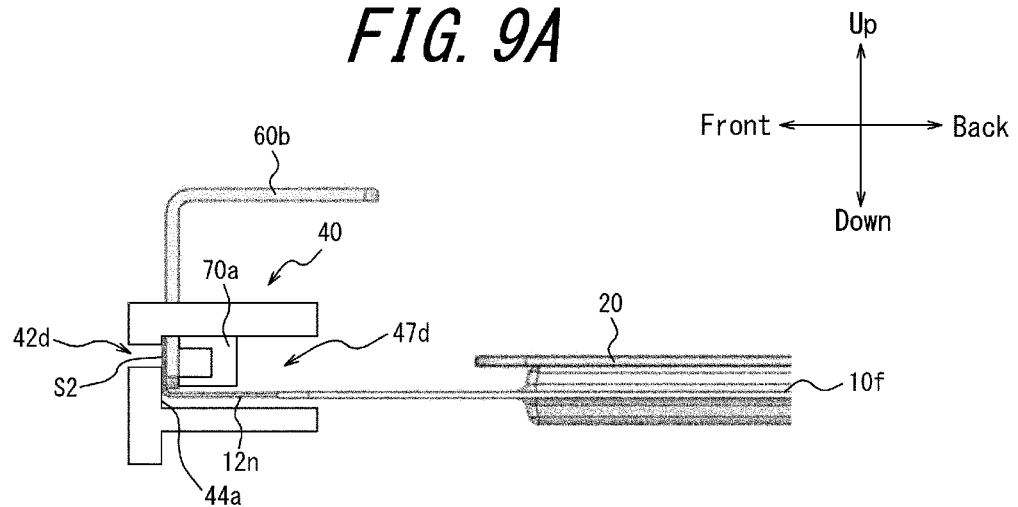
FIG. 9A illustrates an enlargement of a portion R1 surrounded by a dashed line in FIG. 8A.
Figure 9B:
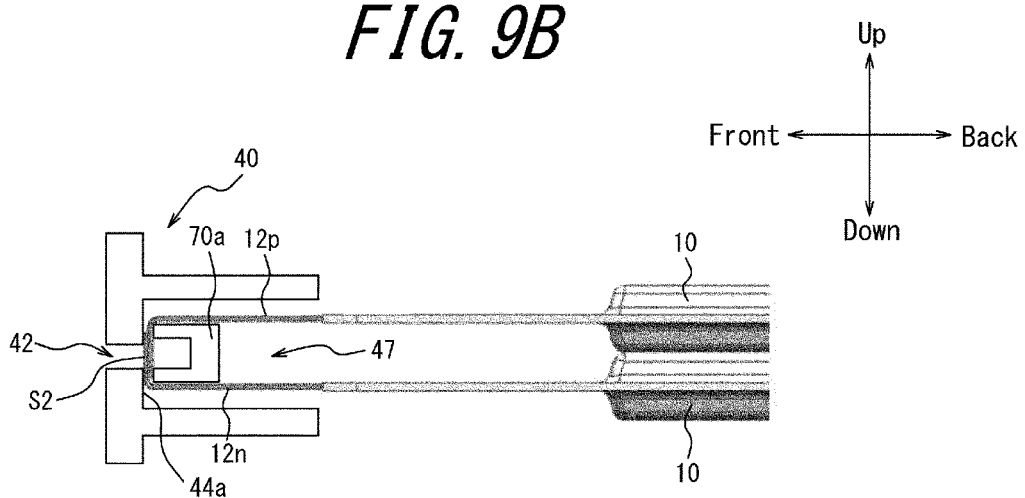
FIG. 9B illustrates an enlargement of a portion R2 surrounded by a dashed line in FIG. 8A.
Figure 10A:
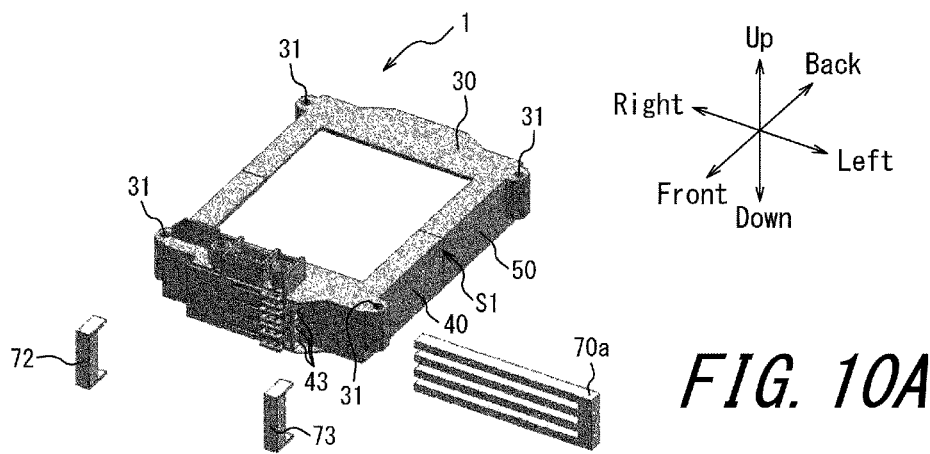
FIG. 10A illustrates the state before a pressing member is inserted into a pressing member insertion hole of the first case.
Figure 10B:
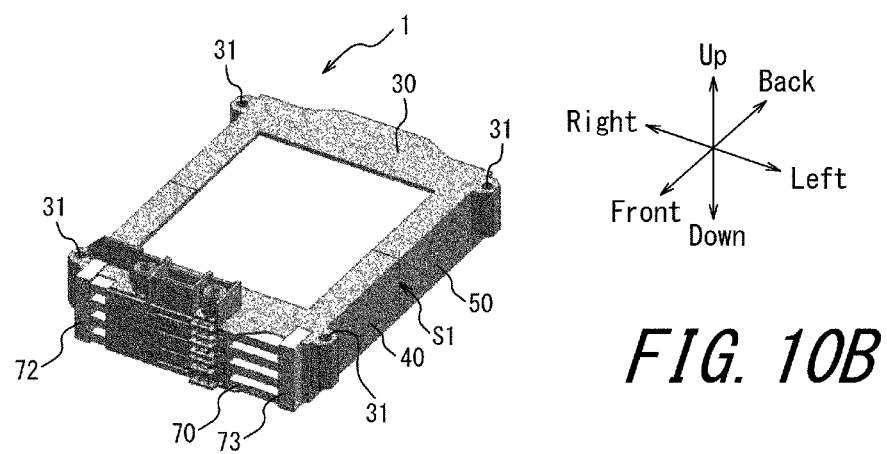
FIG. 10B illustrates the state when the pressing member is fixed to the first case by fixing clamps.
Figure 10C:
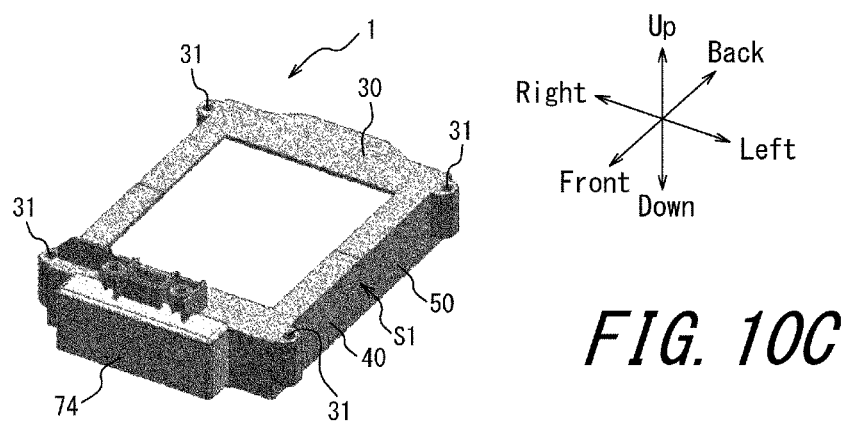
FIG. 10C illustrates an example of attaching an insulating cover to the first case.

FIGS. 7A through 7D are schematic diagrams illustrating the steps for assembling the battery pack 1. FIGS. 7A through 7D are schematic diagrams respectively illustrating representative first through fourth steps for assembling the battery pack 1. FIGS. 8A and 8B are schematic diagrams illustrating the inside of the first case 40 and the second case 50 at the time of the third and fourth steps of FIGS. 7C and 7D. FIG. 8A illustrates an enlargement of a portion of a cross-section along the II-II line of FIG. 7C. FIG. 8B illustrates an enlargement of a portion of a cross-section along the line of FIG. 7D. FIGS. 9A and 9B illustrate an enlargement of the portion surrounded by a dashed line in FIG. 8A. FIG. 9A illustrates an enlargement of the portion R1 surrounded by a dashed line in FIG. 8A. FIG. 9B illustrates an enlargement of the portion R2 surrounded by a dashed line in FIG. 8A. FIGS. 10A through 10C illustrate the pressing member fixed to the case.

Figure 7A:
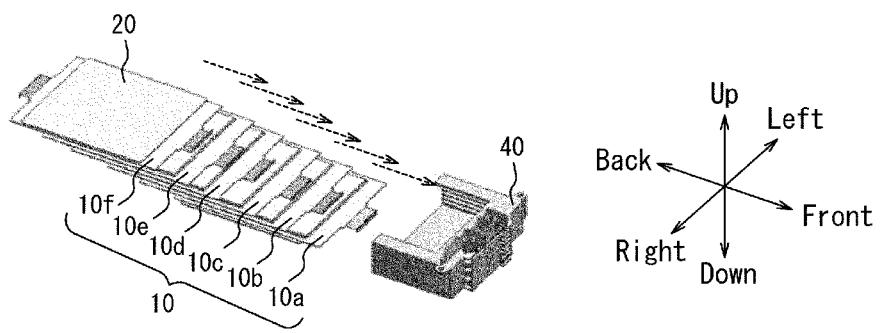
FIG. 7A is a schematic diagram illustrating a first step for assembling a battery pack.
Figure 7B:
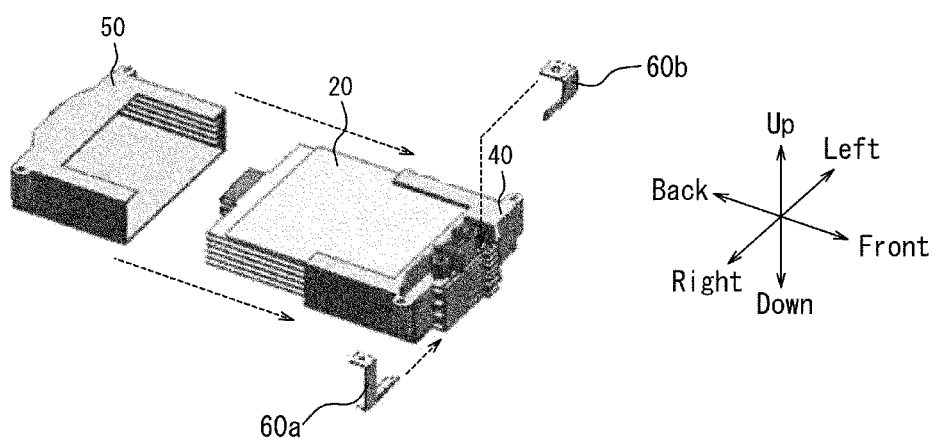
FIG. 7B is a schematic diagram illustrating a second step for assembling a battery pack.

In the first step illustrated in FIG. 7A, six battery cells 10 to be stacked and the insulating sheet 20 are inserted in order one at a time from the bottom into the first case 40. The six battery cells 10 are inserted in the first case 40 with the electrode tabs 12p and 12n having been bent. At this time, each battery cell 10 is positioned by the corresponding portion abutting against the abutting portion 44 of the first case 40, using the electrode tab 12p or 12n, or the outer surface 11, as a reference. In other words, within the battery cell 10, the outer surface 11 on which the electrode tab 12p or 12n is formed is used to position the battery cell 10, in particular the electrode tab 12p or 12n, with respect to the first case 40. The electrode tabs 12p of the battery cell 10 are inserted in a bent state such that the electrode tabs of adjacent battery cells face each other, and such that the tip surface S2 is larger than the window 42. In other words, the bent portion of the electrode tabs 12*p* and 12*n* of adjacent battery cells 10 are folded and overlap each other, and the folded and overlapping portion abuts against the inner wall of the first case 40. The form of abutment between the folded and overlapping portion and the case is described below. In the second step illustrated in FIG. 7B, the second case 50 is fitted from behind onto the first case 40 that holds the battery cells 10 and the insulating sheet 20. At the same time, a total plus bus bar 60*a* and a total minus bus bar 60*b* are fixed temporarily to the first case 40. In the third step illustrated in FIG. 7C, a corresponding pressing member 70*a* is inserted into the pressing member insertion holes 43 of the first case 40 to fix the electrode tabs 12*p* and 12*n* inside the first case 40.

Figure 7C:
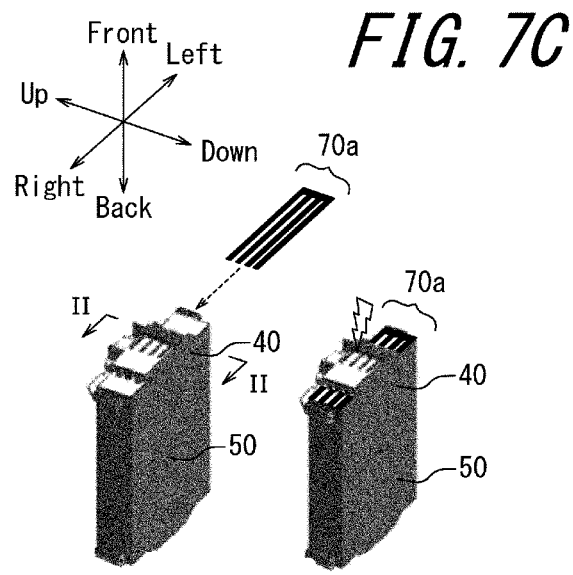
FIG. 7C is a schematic diagram illustrating a third step for assembling a battery pack.

The pressing member 70*a* illustrated in FIG. 7C has a comb-shaped structure that includes parts that extend in the left-right direction and are inserted in the pressing member insertion holes 43 and a connection portion that connects the ends of these parts. Adoption of this structure makes it unnecessary to insert pressing members one at a time into the pressing member insertion holes 43 and can increase productivity. The pressing member 70*a* is made of metal or heat-resistant resin and is covered by an electrically insulating material. The electrode tabs 12*p* and 12*n* are fixed by the pressing member 70*a* to abut against the first inner wall 44*a*. Subsequently, a laser for welding irradiates welding spots through the windows 42 to weld the electrode tabs 12*p* and 12*n*, the electrode tab 12*p* and the total plus bus bar 60*a*, and the electrode tab 12*n* and the total minus bus bar 60*b*. When the electrode tabs 12*p* and 12*n* are welded, the tip of the electrode tab 12*p* and the tip of the electrode tab 12*n* may be welded.

Figure 7D:
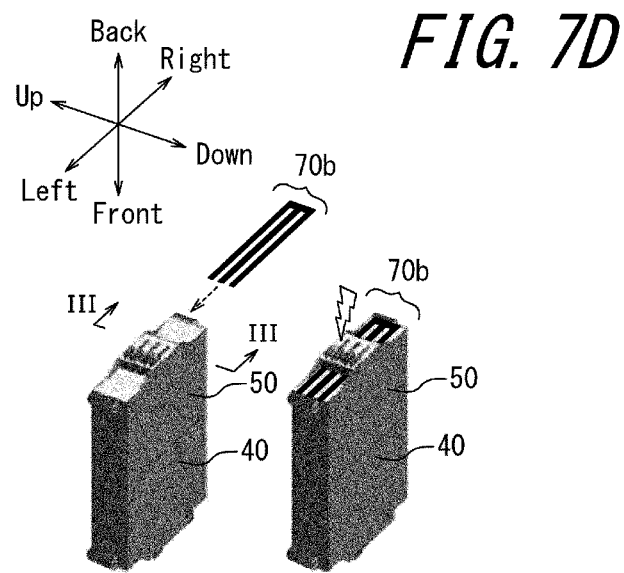
FIG. 7D is a schematic diagram illustrating a fourth step for assembling a battery pack.

In the fourth step illustrated in FIG. 7D, a corresponding pressing member 70*b* is inserted into the pressing member insertion holes 53 of the second case 50 to fix the electrode tabs 12*p* and 12*n*. The pressing member 70*b* illustrated in FIG. 7D has a comb-shaped structure that includes parts that extend in the left-right direction and are inserted in the pressing member insertion holes 53 and a connection portion that connects the ends of these parts. Adoption of this structure makes it unnecessary to insert pressing members one at a time into the pressing member insertion holes 53 and can increase productivity. The pressing member 70*b* is made of metal or heat-resistant resin and is covered by an electrically insulating material. The electrode tabs 12*p* and 12*n* are fixed by the pressing member 70*b* to abut against the first inner wall 54*a*. Subsequently, a laser for welding irradiates welding spots through the windows 52 to weld the electrode tabs 12*p* and 12*n* together. The portion where the electrode tabs 12*p* and 12*n* are welded together may be referred to as the welded portion. The welded portion has a smaller area than the window 52.

The restraining plate 30 is fixed to the upper surfaces of the engaged first case 40 and second case 50 by a suitable method, such as screwing, after the fourth step illustrated in FIG. 7D. This completes the assembly of the battery pack 1.

By the aforementioned steps, the electrode tabs 12*p* and 12*n* of the battery cells 10 are housed in the housing portions 47 of the first case 40 and the housing portions 47 of the second case 50, as illustrated in FIGS. 8A and 8B. In this state, the six battery cells 10 are stacked so that the electrode tabs 12*p* and 12*n* of adjacent battery cells 10 are arranged alternately at the front and back.

For example, the electrode tab 12*p* of the battery cell 10*a* is disposed in the housing portion 47*a*, as illustrated in FIG. 8A. The electrode tab 12*n* of the battery cell 10*b* adjacent to the upper portion of the battery cell 10*a* is disposed in the housing portion 47*b*. Similarly, the electrode tab 12*p* of the battery cell 10*c* adjacent to the upper portion of the battery cell 10*b* is disposed in the housing portion 47*b*. The electrode tabs 12*p* and 12*n* at the front of the battery cells 10*d*, 10*e*, and 10*f* are similarly arranged alternately in the housing portions 47*c* and 47*d*. Consequently, one, two, two, and one electrode tabs are respectively housed in the four housing portions 47 of the first case 40 from bottom to top, with the electrode tabs 12*p* and 12*n* being arranged alternately.

For example, the electrode tab 12*n* of the battery cell 10*a* is disposed in the housing portion 57*a*, as illustrated in FIG. 8B. The electrode tab 12*p* of the battery cell 10*b* adjacent to the upper portion of the battery cell 10*a* is also disposed in the housing portion 57*a*. The electrode tabs 12*p* and 12*n* at the back of the battery cells 10*c*, 10*d*, 10*e*, and 10*f* are similarly arranged alternately in the housing portions 57*b* and 57*c*. Consequently, the electrode tabs 12*p* and 12*n* are arranged alternately from bottom to top in the three housing portions 57 of the second case 50. Two electrode tabs are housed in each housing portion 57.

By thus being bent in vertically opposite directions, the electrode tabs 12*p* and 12*n* of each battery cell 10 are each connected to the electrode tab of opposite polarity of the adjacent battery cell 10. Ultimately, the six battery cells 10 are connected in series.

As illustrated in FIG. 9A, the electrode tab 12*n* of one battery cell 10*f* is housed in the top housing portion 47*d* of the first case 40. The tip of the total minus bus bar 60*b* is also housed in the housing portion 47*d*. For example, the tip surface S2 of the electrode tab 12*n* is opposite the first inner wall 44*a*, and the back side of this tip surface S2 is opposite the tip of the total minus bus bar 60*b*. In other words, the first inner wall 44*a*, the tip of the electrode tab 12*n*, and the tip of the total minus bus bar 60*b* are arranged in this order from the outside towards the inside. These surfaces abut against each other when the pressing member 70*a* is inserted by the third step illustrated in FIG. 7C in this state.

As also illustrated in FIG. 8A, the electrode tab 12*p* of one battery cell 10*a* along with the tip of the total plus bus bar 60*a* are housed in the bottom housing portion 47*a* of the first case 40. The above explanation with reference to FIG. 9A also applies to the relationship between the electrode tab 12*p* and the total plus bus bar 60*a* in the housing portion 47*a*.

As illustrated in FIG. 9B, the electrode tabs 12*p* and 12*n* of two battery cells 10 are housed in a folded and overlapping state in two housing portions 47*b* and 47*c* at the center of the first case 40. For example, the tip surface S2 of the electrode tab 12*n* is opposite the first inner wall 44*a*, and the back side of this tip surface S2 is opposite the tip surface S2 of the electrode tab 12*p*. In other words, the first inner wall 44*a*, the tip of the electrode tab 12*n*, and the tip of the electrode tab 12*p* are arranged in this order from the outside towards the inside. These surfaces abut against each other when the pressing member 70*a* is inserted by the third step illustrated in FIG. 7C in this state. In other words, the pressing member 70*a* causes the folded and overlapping portion of the electrode tabs 12*p* and 12*n* of the battery cell 10, i.e. the tip of the electrode tabs 12*p* and 12*n*, to abut against the inner wall of the first case 40. The area of the window 42 through which the folded and overlapping portion of the electrode tabs 12*p* and 12*n* is partially exposed is smaller than the area of the folded and overlapping portion of the electrode tabs 12*p* and 12*n*, as illustrated in FIG. 9B. Therefore, the folded and overlapping portion of the electrode tabs 12*p* and 12*n* can reliably be abutted against the inner wall 44*a* of the first case 40. The pressing member 70*a* includes a recess 71*a*, recessed towards the inside of the first case 40, at a position opposite the window 42. The tip of the electrode tab 12p is pressed towards the outside by the protruding portion of the recess 71a within the pressing member 70a. The electrode tabs 12p and 12n therefore abut against each other.

The pressing members 70a and 70b may be fixed to the case by fixing members. Removeable fixing clamps, for example, may be used as the fixing members. FIGS. 10A through 10C illustrate an example of the pressing member 70a being fixed to the first case 40 by fixing clamps 72 and 73. FIG. 10A illustrates the state before the pressing member 70a is inserted in the pressing member insertion holes 43 of the first case 40. FIG. 10B illustrates the state when the pressing member is fixed to the first case 40 by the fixing clamps 72 and 73 after having been inserted in the pressing member insertion holes 43 of the first case 40. The fixing clamps 72 and 73 sandwich the left and right ends of the pressure member 70a to fix the pressure member 70a to the first case 40. In the state illustrated in FIG. 10B, a laser for welding irradiates welding spots through the windows 42 to weld the electrode tabs 12p and 12n together, the electrode tab 12p and the total plus bus bar 60a together, and the electrode tab 12n and the total minus bus bar 60b together. The pressing member 70a has been described with reference to FIGS. 10A and 10B, but the pressing member 70b may be similarly fixed by fixing clamps or the like.

After the electrode tabs 12p and 12n are welded, an insulating cover 74 (window housing portion 74) covering the windows 42 and 52 of the first case 40 and the second case 50 may be attached to the first case 40 and the second case 50. FIG. 10C illustrates an example of attaching the insulating cover 74 to the first case 40. The insulating cover 74 is fixed by an appropriate method, such as engaging claws provided on the first case 40. The insulating cover 74 may also be configured to cover the pressing member insertion holes 43 and 53.

Figure 11A:
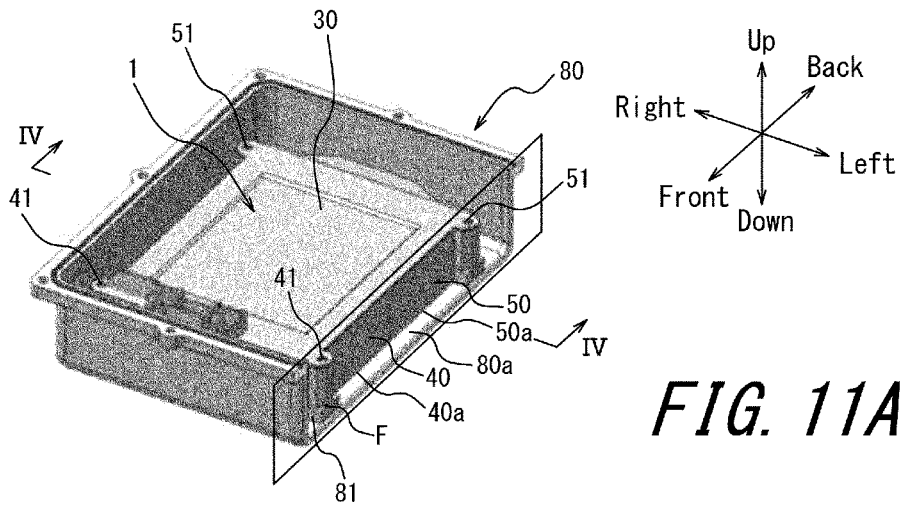
FIG. 11A is a perspective view, from the top, illustrating a cross-section of a body supporting a battery pack.
Figure 11B:
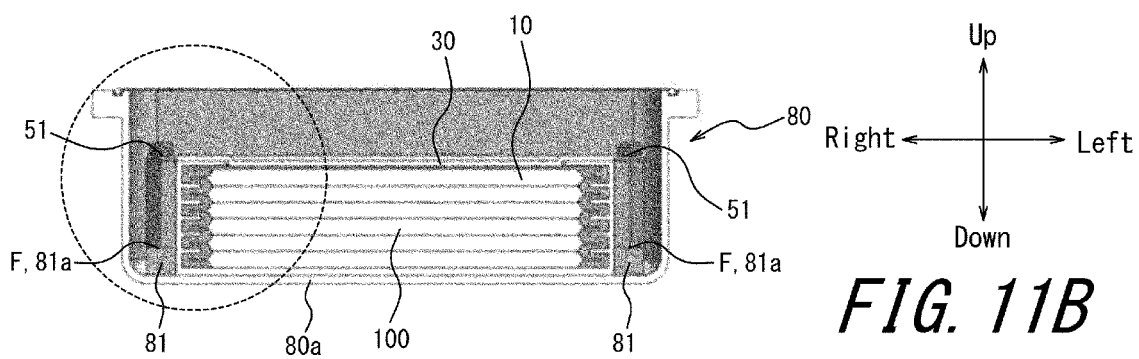
FIG. 11B is a cross-sectional view along the IV-IV line of FIG. 11A.
Figure 11C:
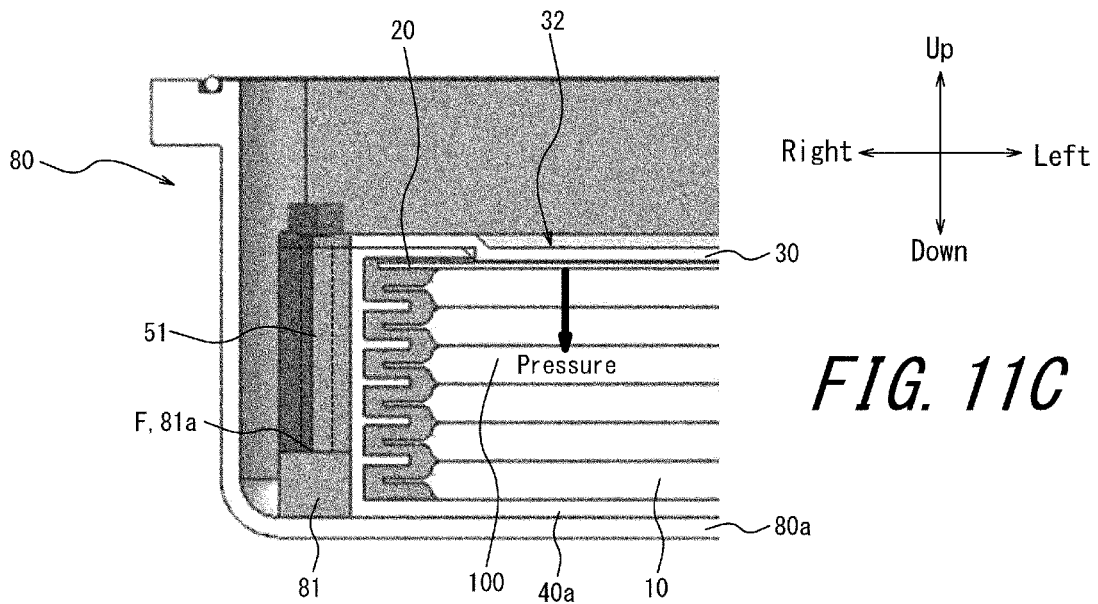
FIG. 11C illustrates an enlargement of the portion surrounded by a dashed line in FIG. 11B.

FIGS. 11A through 11C illustrate the battery pack 1 housed in a body 80. FIG. 11A is a perspective view, from the top, illustrating a cross-section of the body 80 supporting the battery pack 1. FIG. 11B is a cross-sectional view along the IV-IV line of FIG. 11A. FIG. 11C illustrates an enlargement of the portion surrounded by a dashed line in FIG. 11B.

The body 80 is suitably configured by a metal material such as aluminum. This configuration is not limiting, and the body 80 may be made of any highly rigid material. For example, the body 80 may be made of a highly rigid resin material or a metal material provided with an electrically insulating material, such as PET resin, on the surface thereof.

The battery pack 1 is fixed to the inside of the body 80 by a suitable method, such as screwing. In greater detail, the battery pack 1 is housed inside the body 80 with the bottom surface 40a of the first case 40 and the bottom surface 50a of the second case 50 abutting against a bottom surface 80a of the body 80. At this time, the bottom surface 80a of the body 80 functions as a restraining member for restraining the stacked battery cells 10 from below, like the upper restraining plate 30. The stacked battery cells 10 are thus restrained indirectly by the bottom surface 80a as a result of abutting against the bottom surface 40a of the first case 40 and the bottom surface 50a of the second case 50, which abut against the bottom surface 80a. This configuration is not limiting, however. The bottom surface 80a need not abut against the bottom surface 40a of the first case 40 and the bottom surface 50a of the second case 50 if, for example, the bottom surface 40a and the bottom surface 50a themselves can function as a restraining member with sufficient rigidity.

As illustrated in FIGS. 11A through 11C, fixing portions F of the first case 40 and the second case 50 relative to the body 80 are provided farther inward than the bottom surface 80a of the body 80. The fixing portions F are thus positioned above the bottom surface 80a to be closer to the center of gravity of a battery cell assembly 100 formed by six stacked battery cells 10.

The fixing portions F may, for example, be configured as follows. The two screw holes 41 of the first case 40 may be configured to penetrate from the upper surface to the lower surface of the first case 40, for example. Similarly, the two screw holes 51 of the second case 50 may be configured to penetrate from the upper surface to the lower surface of the second case 50, for example. To support the two screw holes 41 and the two screw holes 51, the body 80 includes supports 81 protruding inward from the bottom surface 80a at corresponding positions. Screw holes 81a are provided on the upper surface of the supports 81. The screws inserted from above through the two screw holes 41 and the two screw holes 51 are screwed into the screw holes 81a. For example, the first case 40 and the second case 50 may be fixed to the body 80 by screws being inserted into the screw holes 41 and the screw holes 51 and screwed into the screw holes 81a. The fixing portion F may thus be formed by the screw hole 41 or the screw hole 51 together with the screw hole 81a.

In this way, the bottom surface of the battery pack 1 is fixed in a state of abutment against the bottom surface 80a of the body 80. Accordingly, the bottom side of the battery pack 1 is firmly restrained from below by the bottom surface 80a of the body 80. If the top side of the battery pack 1 were only configured by the first case 40, the second case 50, and the insulating sheet 20, then the restraining force would be weaker than at the bottom side. This problem is addressed by the restraining plate 30 being fixed to the first case 40 and the second case 50 to cover the battery cell assembly 100 from one side in the stacking direction, i.e. from above, while the battery pack 1 is fixed to the body 80. As described above, the restraining plate 30 includes the recess 32 that is recessed one step towards the upper surface of the battery cell assembly 100. The insulating sheet 20 is disposed between the restraining plate 30 and the upper surface of the battery cell assembly 100 at this time. The insulating sheet 20 abuts against the recess 32 of the restraining plate 30 and the upper surface of the battery cell assembly 100. On the other hand, the bottom surface 40a of the first case 40 and the bottom surface 50a of the second case 50 abut against the bottom surface 80a of the body 80. In other words, the upper surface of the battery cell assembly 100 is pressed from above by the restraining plate 30 while, simultaneously, the lower surface of the battery cell assembly 100 is supported by the bottom surface 80a of the body 80 via the abutment against the bottom surface 40a of the first case 40 and the bottom surface 50a of the second case 50. The position of each battery cell 10 in the up-down direction is thereby regulated. At this time, gas produced inside the battery cells 10 due to deterioration over time tends to collect around the battery cells 10 due to pressure in the stacking direction. In other words, the internal gas collects at a location away from the electrodes formed in the central region.

Typically, the battery characteristics of the battery cell 10 and the pressure in the stacking direction of the battery cells 10 are correlated. Specifically, the electrode spacing inside the battery cells 10 stabilizes when a predetermined pressure is applied. The internal resistance therefore lowers, and the battery characteristics of the battery cells 10 improve. On the other hand, application of excessive pressure impedes the chemical reaction itself inside the battery cell 10, and the battery characteristics worsen. Therefore, when the battery pack 1 is assembled, the restraining plate 30 is preferably fixed to apply pressure within a predetermined pressure range in order to obtain good battery characteristics that are stable over time. Even if the battery cells 10 swell due to deterioration over time, which by reaction would increase the pressure in the stacking direction of the battery cells 10, an optimal pressure capable of maintaining battery characteristics can still be secured.

In the above battery pack 1 according to the first embodiment, the electrode tabs 12p and 12n of the battery cells 10 are stored in the first case 40 and the second case 50 to be folded and overlapping, and the electrode tabs 12p and 12n are welded together by irradiation of a laser from the windows 42 and windows 52 provided at positions facing the folded and overlapping portion of the electrode tabs 12p and 12n. The electrode tabs 12p and 12n of the battery cells 10 can thereby be welded without being trimmed.

Before the step to weld the electrode tabs 12p and 12n together in the battery pack 1 according to the first embodiment, the folded and overlapping portion is abutted against the inner wall of the first case 40 and the second case 50 by the pressing members 70a and 70b. This can reduce the gap between the electrode tabs 12p and 12n and improve weldability.

The pressing members 70a and 70b are made of metal or heat-resistant resin and are covered by an electrically insulating material. Hence, a short-circuit can be prevented and dissolution of the pressing member at the time of welding can be suppressed when the electrode tabs 12p and 12n are abutted against the inner walls of the first case 40 and the second case 50.

The pressing member 70a includes the recess, recessed towards the inside of the first case 40, at a position opposite the window 42. Similarly, the pressing member 70b includes the recess, recessed towards the inside of the second case 50, at a position opposite the window 52. Dissolution of the pressing member at the time of welding can thereby be suppressed.

The battery pack 1 according to the first embodiment includes the fixing members 72 and 73 that fix the pressing members 70a and 70b to the first case 40 and the second case 50. The pressing members 70a and 70b can therefore be fixed to the first case 40 and the second case 50, improving weldability and productivity.

The battery pack 1 according to the first embodiment includes the insulating cover 74 that covers the windows 42 and 52. Therefore, insulation of the welded portion can be secured, and the reliability of the battery pack 1 can be improved.

The battery pack 1 according to the first embodiment enables accurate positioning when the electrode tabs 12p and 12n of adjacent battery cells 10 are welded together. Specifically, the electrode tab 12p or 12n, or the outer surface 11, that becomes the reference for positioning and the portion to be welded are disposed near each other. The battery pack 1 thereby enables the electrode tabs 12p and 12n to be positioned more accurately at the time of welding than when the reference for positioning and the portion to be welded are disposed on outer surfaces in different directions of the battery cell. In particular, since the abutting portion 44 is formed by the first inner wall 44a in the battery pack 1, the electrode tab 12p or 12n that serves as the reference for positioning and the portion to be welded can be arranged at substantially the same position. The positioning accuracy of the electrode tabs 12p and 12n is thereby further increased at the time of welding. The battery pack 1 can thus simplify the welding process of the electrode tabs 12p and 12n and facilitate welding operations. Consequently, the battery pack 1 can also contribute to improving product reliability.

The battery pack 1 has improved ease of insertion of the battery cells 10 into the first case 40 and the second case 50 as a result of inclusion of the guides 45 and 55 and the second insulating portions 46b and 56b. This effect is also obtained by a configuration with at least one of the guides 45 and 55 and the second insulating portions 46b and 56b. This effect is most significant when all of these configurations are provided. The battery pack 1 can have further improved ease of insertion when the tapered portions 45a and 55a are provided in the guides 45 and 55. Specifically, the battery pack 1 can prevent the electrode tabs 12p and 12n from coming into contact with the inner surface of the first case 40 or the second case 50 and deforming at the time of insertion and can reliably house the electrode tabs 12p and 12n in the housing portions 47 and 57. In particular, the formation of the tapered portions 45a and 55a causes the separation width between the guides 45 and 55 in the up-down direction to increase towards the inside, making it easier to avoid interference between the electrode tabs 12p and 12n and the inner wall of the case at the time of insertion. The battery pack 1 can simplify the production process of the first case 40 and the second case 50 by the same number of guides 45 and 55 being provided at the same positions in the left-right direction. In other words, the battery pack 1 can contribute to improving productivity.

By provision of the first insulating portions 46a and 56a and the second insulating portions 46b and 56b in the battery pack 1, electrical insulation can be secured between adjacent battery cells 10 in the stacking direction. In addition to the initial state, insulation can thus also be maintained if the battery cells 10 swell due to deterioration over time, changing the position of the electrode tabs 12p and 12n in the up-down direction.

The outer surface 13 perpendicular to the stacking direction of the battery cells 10 is restrained by the restraining plate 30 in the battery pack 1. Swelling in the stacking direction of the battery cells 10 can thereby be suppressed if an internal gas is produced during use of the battery pack 1, during charging/discharging, or by deterioration over time. When the restraining plate 30 is made of a metal material, the rigidity thereof increases, and the battery pack 1 can effectively suppress swelling of the battery cells 10.

Provision of the insulating sheet 20 and the restraining plate 30 on only one side of the stacked battery cells 10 can reduce the number of components and increase productivity of the battery pack 1. In this way, the battery pack 1 is advantageous in terms of the number of components and productivity as compared to a known battery pack in which a cell cover is provided for each battery cell, for example, to protect the battery cells. The simplified configuration of the battery pack 1 can, in other words, contribute to improving productivity and reducing costs. By the battery cells 10 being fixed together, the battery cell 10 and the insulating sheet 20 being fixed together, and the insulating sheet 20 and restraining plate 30 being fixed together by adhesive, the resistance of the battery pack 1 to vibration or shock improves. For example, when the battery pack 1 is mounted in a vehicle, the relative displacement between components due to vibration, shock, or the like when the vehicle is moving can be prevented. In this way, the components inside the battery pack 1 are firmly fixed to each other to prevent damage to the internal components from vibration or shock.

The battery pack 1 can achieve a smaller size and a lower profile while suppressing swelling of the stacked battery cells 10. Specifically, swelling in the stacking direction of the battery cells 10 can be suppressed in the battery pack 1 by the upper surface of the battery cell assembly 100 being pressed from one side in the stacking direction by the restraining plate 30 while the lower surface is abutted against the bottom surface 40a of the first case 40 and the bottom surface 50a of the second case 50. At the same time, only one restraining plate 30 is used, providing the battery pack 1 with a smaller size, a lower profile, and a lighter weight than a conventional battery module that includes a plurality of restraining plates. Similarly, the battery pack 1 can contribute to reducing the number of components and the cost.

The battery pack 1 can suppress deterioration of the first case 40 and the second case 50 by including the opening O. If the opening O were omitted, and the restraining plate 30 were provided directly on the upper surface of the first case 40 and the second case 50, then the restraining plate 30 would apply pressure directly on these cases, causing the cases to deform and accelerating deterioration. Accordingly, the battery pack 1 can prevent damage to the case due to such degradation over time.

The configuration of the recess 32 of the restraining plate 30 in the battery pack 1 enables suitable application of pressure to the central region of the outer surface 13 of the battery cell 10 that is perpendicular to the stacking direction. The battery pack 1 can thereby further suppress swelling in the stacking direction of the battery cells 10. The application of pressure with the restraining plate 30 enables suitable retention of the battery cell assembly 100 inside the first case 40 and the second case 50, thereby making retention more reliable in the battery pack 1. In other words, the battery pack 1 can more firmly fix the battery cell assembly 100 by the pressure from the recess 32. Application of pressure within an optimal range capable of maintaining good battery characteristics in the battery pack 1 can stabilize the internal resistance in the battery cells 10. The pressure in the battery pack 1 releases internal gas from near the electrodes to the outer periphery of the battery cells 10, thereby suppressing degradation of the battery cells 10. In other words, the battery pack 1 suppresses the degradation of battery characteristics that occurs when internal gas is present between electrodes. In particular, the battery pack 1 can concentrate more pressure on the central region of the outer surface 13 of the battery cells 10 and more effectively suppress swelling of the battery cells 10 in the stacking direction by the surface of the recess 32 being formed to protrude further inward towards the central region. In this case, the battery pack 1 can more efficiently collect the internal gas at the outer periphery of the battery cells 10.

By the arrangement of the insulating sheet 20, the battery pack 1 can secure electrical insulation between the restraining plate 30 and the internal battery cells 10.

The battery cell assembly 100 can also be further supported in the battery pack 1 by the bottom surface 40a of the first case 40 and the bottom surface 50a of the second case 50 abutting against the bottom surface 80a of the body 80. In particular, the battery pack 1 includes the restraining plate 30 on the upper surface side, whereas the bottom surface of the battery pack 1 abuts against the bottom surface 80a of the body 80. The battery cell assembly 100 is thereby firmly restrained from both sides in the up-down direction. Furthermore, as a result of the restraint provided by the restraining plate 30 and the bottom surface 80a in the up-down direction, the first case 40 and the second case 50 tend not to warp even when supporting the battery cell assembly 100.

In other words, warping of the first case 40 and the second case 50 is regulated by the restraining plate 30 and the bottom surface 80a.

The battery pack 1 can fix the battery cell assembly 100, which is a heavy load, in a balanced manner by the fixing portions F being arranged closer to the center of gravity of the battery cell assembly 100. For example, when the battery pack 1 is mounted in a vehicle, the stress occurring due to vibration, shock, or the like when the vehicle is moving can be relieved. Consequently, the battery pack 1 can contribute to improving product reliability. This arrangement in the battery pack 1 can also contribute to lowering the profile.

The first case 40 and the second case 50 in the battery pack 1 are made of a resin material or a metal material provided with an electrically insulating material on the surface thereof. Electrical insulation can thereby be secured between components external to the battery pack 1, such as electrical components, and the battery cells 10 inside the battery pack 1.

The electrical insulation in the battery pack 1 can be further improved by forming the restraining plate 30 from a metal material coated with an electrically insulating material or a resin material, like the first case 40 and the second case 50. In this case, the restraining plate 30 can be reduced in weight, and the battery pack 1 can be manufactured at a low cost. This contributes to a reduction in weight and cost of the battery pack 1 itself.

Second Embodiment

Figure 12A:
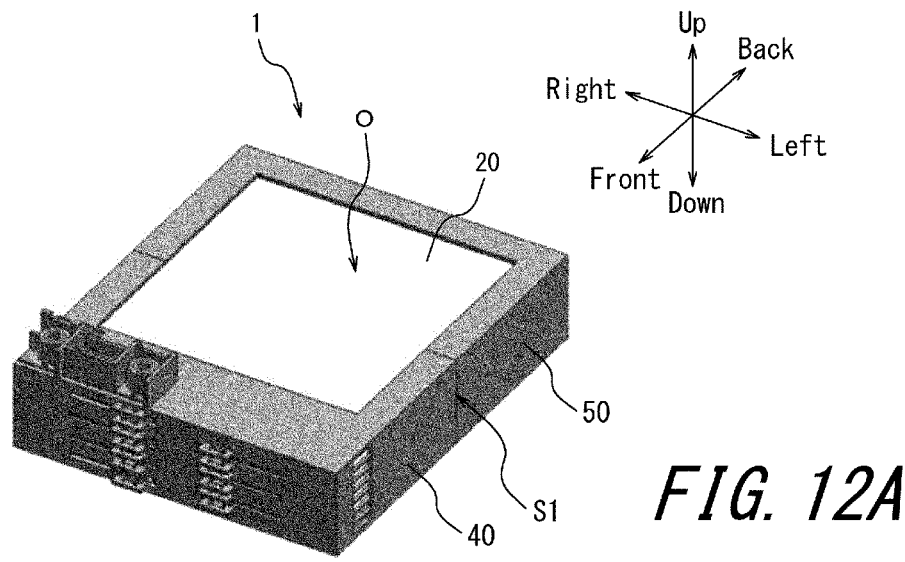
FIG. 12A is a perspective view illustrating the appearance of a battery pack according to a second embodiment of the present disclosure.
Figure 12B:
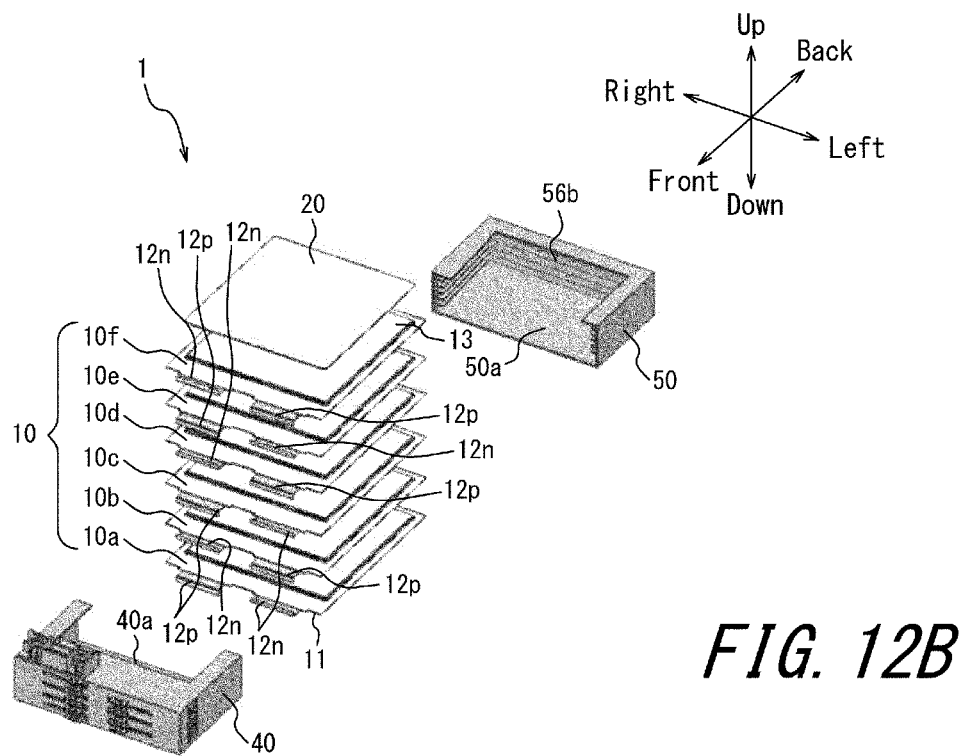
FIG. 12B is an exploded perspective view of the battery pack according to the second embodiment of the present disclosure.
Figure 13:
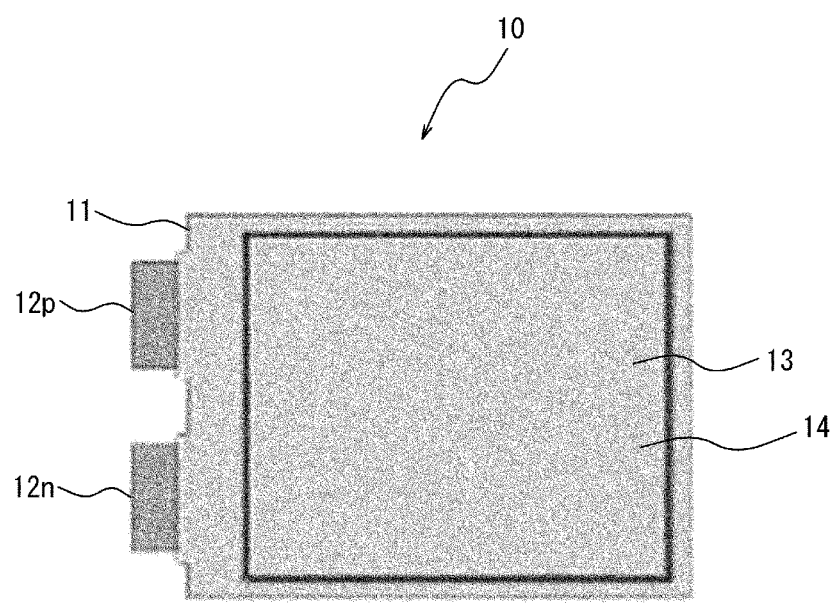
FIG. 13 is a top view illustrating only the battery cell of FIGS. 12A and 12B.
Figure 13:
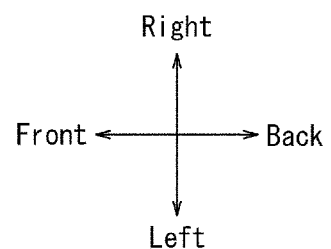

FIG. 12A is a perspective view illustrating the appearance of a battery pack 1 according to a second embodiment of the present disclosure. FIG. 12A illustrates the completed battery pack 1. FIG. 12B is an exploded perspective view of the battery pack 1 according to a second embodiment of the present disclosure. FIG. 13 is a top view illustrating only the battery cell 10 of FIG. 12A and FIG. 12B. The battery pack 1 according to the second embodiment differs from the first embodiment in that the electrode tabs 12p and 12n of the battery cell 10 are formed on the same surface. The configuration that is the same as in the first embodiment is labeled with the same reference signs below. A description of this configuration is omitted to focus on the differences from the first embodiment.

As illustrated in FIG. 13, the outer surface 11 of the battery cell 10 protrudes one step farther outward in the central region of each of two halves aligned in the left-right direction than at the left and right edges. In other words, the outer surface 11 is formed so that two convex shapes are continuous in the left-right direction when viewed from the top. The electrode tabs 12p and 12n protrude forward from the two portions of the outer surface 11 that protrude one step outward. The electrode tabs 12p and 12n protrude outward symmetrically to be substantially L-shaped. For example, the electrode tab 12p protrudes linearly towards the front and then bends downwards. The electrode tab 12n protrudes linearly towards the front and then bends upwards.

As illustrated in FIG. 12B, six battery cells 10 are stacked so that the positions of the electrode tabs 12p and 12n in the left-right direction differ between adjacent battery cells 10. Specifically, the electrode tab 12p is arranged at the right side and the electrode tab 12n is arranged at the left side on the outer surface 11 of the lowest battery cell 10a. The electrode tab 12n is arranged at the right side and the electrode tab 12p is arranged at the left side on the outer surface 11 of the battery cell 10b that is adjacent to and above the battery cell 10a. The electrode tabs 12p and 12n are also similarly arranged for the battery cells 10c, 10d, 10e, and 10f.

Figure 14A:
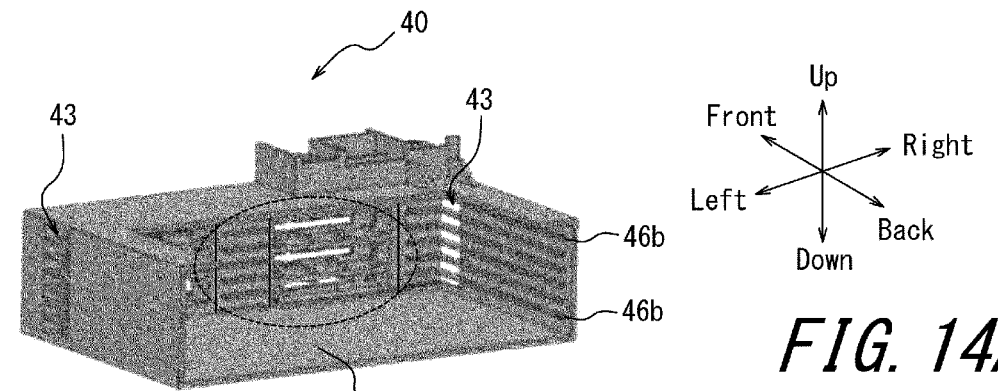
FIG. 14A is a perspective view, from the back, of only the first case of FIGS. 12A and 12B and illustrates an enlargement of the portion thereof surrounded by a dashed line.
Figure 14A:
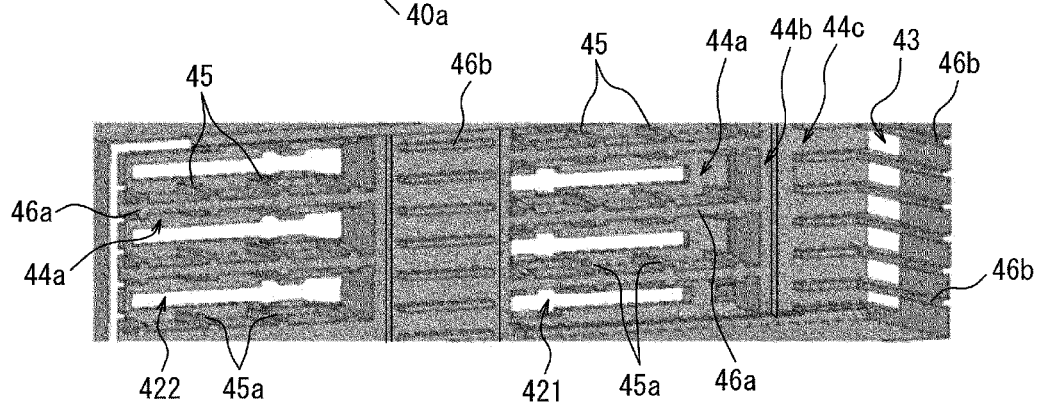
Figure 14B:
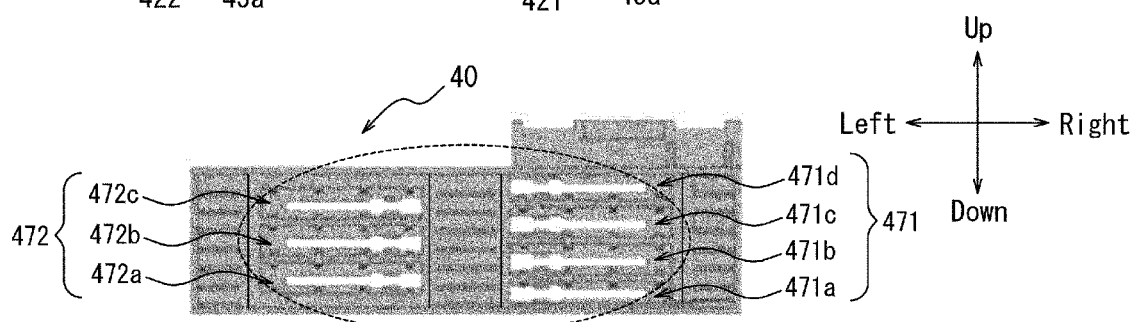
FIG. 14B is a back view of only the first case of FIGS. 12A and 12B and illustrates an enlargement of the portion thereof surrounded by a dashed line.
Figure 14B:
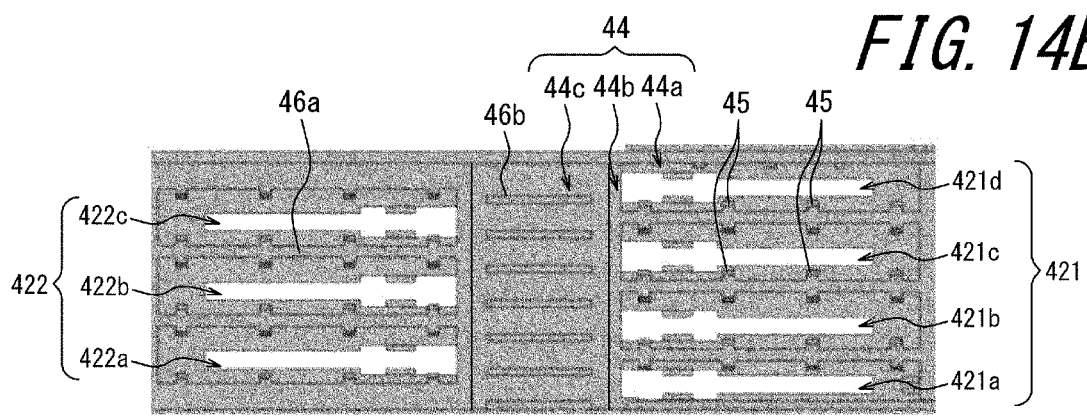

FIGS. 14A and 14B illustrate only the first case 40 of FIG. 12A and FIG. 12B. FIG. 14A is a perspective view, from the back, of the first case 40 and illustrates an enlargement of the portion thereof surrounded by a dashed line. FIG. 14B is a back view of the first case 40 and illustrates an enlargement of the portion thereof surrounded by a dashed line.

Four substantially rectangular windows 421 that penetrate through the right half and three substantially rectangular windows 422 that penetrate through the left half extend on the front surface of the first case 40 in the left-right direction. One half of each window 421 and window 422 in the left-right direction is formed to be wider in the up-down direction than the other half. The four windows 421 are arranged in a line in the up-down direction so that the positions of the left and right ends and the positions of the wide halves in the left-right direction are aligned. Similarly, the three windows 422 are arranged in a line in the up-down direction so that the positions of the left and right ends and the positions of the wide halves in the left-right direction are aligned.

The three windows 422 are formed to be located in the up-down direction between the corresponding windows 421. In greater detail, the four windows 421 are referred to as windows 421a, 421b, 421c, and 421d in order from bottom to top, and the three windows 422 are referred to as windows 422a, 422b, and 422c in order from bottom to top. In this case, the window 422a is positioned between the window 421a and the window 421b in the up-down direction. The window 422b is positioned between the window 421b and the window 421c in the up-down direction. The window 422c is positioned between the window 421c and the window 421d in the up-down direction. For example, the wide half of the windows 421 and the wide half of the windows 422 may be positioned by the central region of the front surface of the first case 40.

The first case 40 includes an abutting portion 44 against which the outer surface 11 of the battery cell 10, or the electrode tabs 12p and 12n protruding from the outer surface 11, abuts. The abutting portion 44 is, for example, preferably configured by a first inner wall 44a of the first case 40 faced by the electrode tabs 12p and 12n of the battery cell 10 when the battery cell 10 is inserted into the first case 40. In other words, the first inner wall 44a is configured by the surface on which the windows 421 and 422 are formed within the back side of the front surface of the first case 40. In this case, the tip surface S2 of the electrode tabs 12p and 12n abuts against the first inner wall 44a when the six battery cells 10 are inserted in the first case 40.

The first case 40 includes a second inner wall 44b formed one step farther inward than the first inner wall 44a. The abutting portion 44 may be configured by the second inner wall 44b. In this case, when the six battery cells 10 are inserted in the first case 40, the central region of each of the two halves that protrude one step farther outward than at the left and right edges on the outer surface 11 abuts against the second inner wall 44b.

The first case 40 includes a third inner wall 44c formed one step farther inward than the second inner wall 44b. The abutting portion 44 may be configured by the third inner wall 44c. In this case, when the six battery cells 10 are inserted in the first case 40, the central region and the left and right edges of the outer surface 11, which are recessed one step farther inward than the central regions of the two halves, abut against the third inner wall 44c.

In this way, each battery cell 10 is positioned by abutting the corresponding portion against the abutting portion 44 of the first case 40, using the electrode tabs 12p and 12n, or the outer surface 11, as a reference. The abutting portion 44 is positioned near the windows 421 and 422. In greater detail, the abutting portion 44 is formed in the first case 40 to be at the same position on the front edge as the front central region where the windows 421 and 422 are formed.

The first case 40 further includes guides 45, tapered portions 45a, and first insulating portions 46a configured as in the first embodiment. A total of five first insulating portions 46a are provided, one between each of the four windows 421 and the three windows 422.

The first case 40 includes four housing portions 471 and three housing portions 472 therein. The back side of each of the left and right halves on the front surface is divided in the up-down direction into the housing portions by three first insulating portions 46a and two first insulating portions 46a. In other words, each housing portion 471 and 472 houses the electrode tabs 12p and 12n arranged at the corresponding position in the up-down direction. The four housing portions 471 are referred to below as the housing portions 471a, 471b, 471c, and 471d in order from bottom to top. The three housing portions 472 are referred to below as the housing portions 472a, 472b, and 472c in order from bottom to top. The housing portions are referred to collectively as housing portions 471 and 472 when no distinction therebetween is made. The windows 421a through 421d are disposed at the front end of the housing portions 471a through 471d. The windows 422a through 422c are disposed at the front end of the housing portions 472a through 472c.

The first case 40 includes second insulating portions 46b protruding inward from the inner surface at both sides in the left-right direction along the third inner wall 44c. The second insulating portions 46b insulate adjacent battery cells 10 from each other when the battery cells 10 are stacked.

Pressing member insertion holes 43 are formed on the front portion at the left and right side surfaces of the first case 40. A pair of pressing member insertion holes 43 is formed in correspondence with each of the seven windows 421 and 422 at substantially the same height position as each window 421 and 422. The pressing member 70a inserted through the pressing member insertion holes 43 has a comb-shaped structure that includes seven parts that extend in the left-right direction and are inserted in the seven pairs of insertion holes and a connection portion that connects the ends of these parts.

As illustrated in FIG. 12B, the second case 50 may include second insulating portions 56b that protrude to be substantially C-shaped along the inner surface. The second insulating portions 56b may, for example, be formed only on the left and right side surfaces or only on the back surface. The second insulating portions 56b insulate adjacent battery cells 10 from each other when the battery cells 10 are stacked. The same number of second insulating portions 56b are preferably arranged at the same positions in the up-down direction as the second insulating portions 46b of the first case 40.

The second case 50 may include guides 55 like the first embodiment. In this case, a suitable number of guides 55 are suitably arranged to protrude from at least one of the upper surface and lower surface of the second insulating portions 56b formed on the back surface, for example.

The windows 421 and 422 are concentrated on the front surface in the present embodiment. This makes the fourth step described with reference to FIG. 7D unnecessary, and the pressing member insertion holes 53 in the second case 50 unnecessary, when assembling the battery pack 1. After assembly of the battery pack 1 is completed by steps similar to the first step through the third step described with reference to FIG. 7A through FIG. 7C, the electrode tabs 12$p$ and 12$n$ of each battery cell 10 are housed in the housing portions 471 and 472 of the first case 40. In this state, the six battery cells 10 are stacked so that the electrode tabs 12$p$ and 12$n$ of adjacent battery cells 10 are arranged alternately.

For example, the electrode tab 12$p$ of the battery cell 10$a$ and a non-illustrated total plus bus bar 60$a$ are disposed in the housing portion 471$a$. The electrode tab 12$n$ of the battery cell 10$a$ and the electrode tab 12$p$ of the battery cell 10$b$ adjacent to the upper portion of the battery cell 10 are disposed in the housing portion 472$a$. Similarly, the electrode tab 12$n$ of the battery cell 10$b$ and the electrode tab 12$p$ of the battery cell 10$c$ adjacent to the upper portion of the battery cell 10$b$ are disposed in the housing portion 471$b$. The electrode tabs 12$p$ and 12$n$ are similarly arranged alternately in the housing portions 472$b$, 471$c$, 472$c$, and 471$d$. A non-illustrated total minus bus bar 60$b$ is also disposed in the housing portion 471$d$ in addition to the electrode tab 12$n$ of the battery cell 10$f$. In this state, the pressing member 70$a$ is inserted through the pressing member insertion holes 43, and the tip surfaces S2 of the electrode tabs 12$p$ and 12$n$ abut against each other. Subsequently, a laser for welding irradiates welding spots through the windows 421 and 422 to weld the electrode tabs 12$p$ and 12$n$ together.

The above battery pack 1 according to the second embodiment achieves similar effects to those described in the first embodiment. Additionally, the battery pack 1 according to the second embodiment can reduce the number of assembly steps, since the windows 421 and 422 are concentrated on the front surface. The battery pack 1 can thereby contribute to improving productivity. Furthermore, the electrode tabs 12$p$ and 12$n$ of the battery cell 10 are formed only on the outer surface 11, leaving the back of the battery cell 10 flat. The front to back width of the battery cell 10 thus becomes shorter by an amount equal to the electrode tab 12$p$ or 12$n$. The front to back width of the second case 50 therefore also becomes shorter, and the battery pack 1 can contribute to an overall reduction in size.

Third Embodiment

Figure 15:
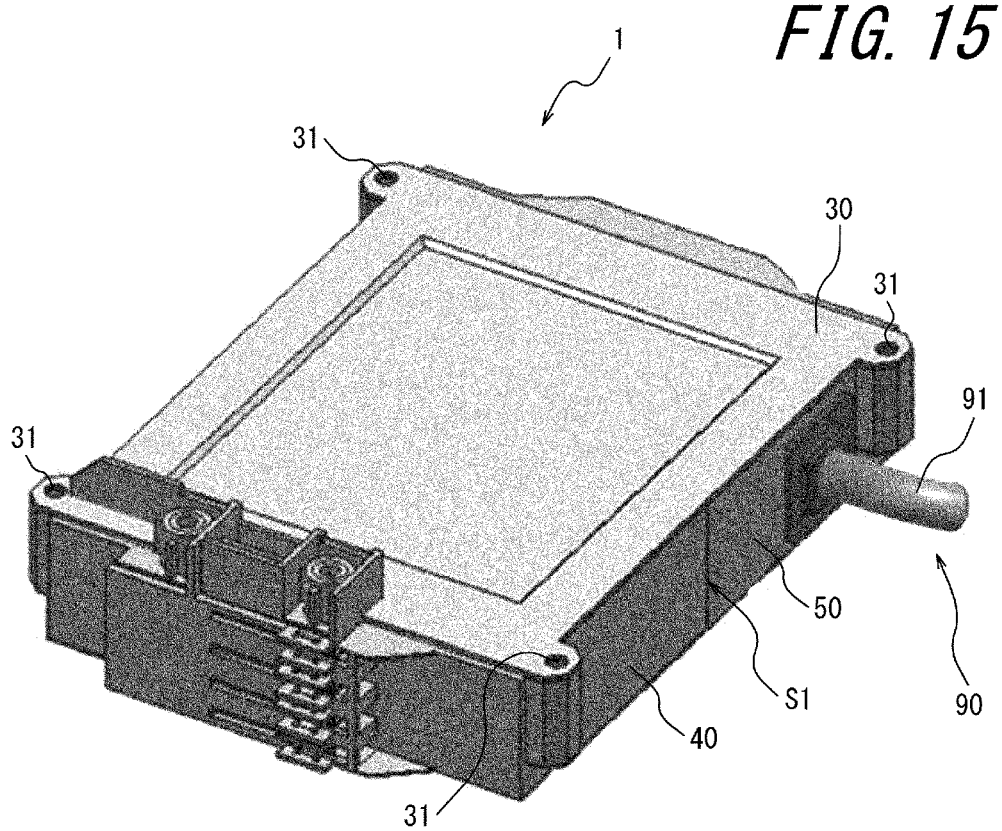
FIG. 15 is a perspective view illustrating the appearance of a battery pack according to a third embodiment of the present disclosure.
Figure 15:
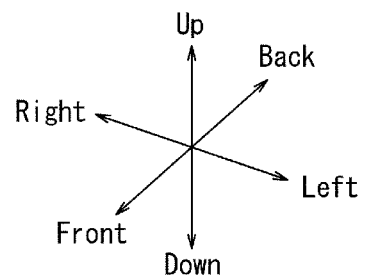

FIG. 15 is a perspective view illustrating the appearance of a battery pack 1 according to a third embodiment of the present disclosure. As illustrated in FIG. 15, the battery pack 1 according to the third embodiment has the configuration of the battery pack 1 according to the first embodiment, with the addition of a discharge portion 90 for discharging gas produced inside the battery cells 10 to the outside. The battery pack 1 may have the configuration of the battery pack 1 according to the second embodiment, with the addition of the discharge portion 90. The configuration that is the same as in the first and second embodiments is labeled with the same reference signs below. A description of this configuration is omitted to focus mainly on the discharge portion 90, which differs from the first and second embodiments.

One discharge portion 90 is provided on the left side surface of the second case 50, for example. The discharge portion 90 has a discharge tube 91 extending to the outside from this side surface. The discharge portion 90 may be provided on any outer surface of the first case 40 and the second case 50 other than the left side surface of the second case 50, as long as internal gas can efficiently be discharged to the outside. The present embodiment is not limited to including only one discharge portion 90 and may include a plurality thereof.

Gas is produced inside the battery cells 10 along with deterioration over time. If the pressure of the internal gas exceeds a predetermined value, the internal gas is released to the outside from the surrounding edges of the battery cells 10. The discharge portion 90 guides the internal gas released from the battery cells 10 through the discharge tube 91 to the outside of the battery pack 1.

The above battery pack 1 according to the third embodiment achieves similar effects to those described in the first and second embodiments. Additionally, the battery pack 1 according to the third embodiment increases safety by guiding the internal gas outside through the discharge portion 90. In other words, the battery pack 1 can improve product reliability.

It will be apparent to a person of ordinary skill in the art that the present disclosure can be embodied in forms other than the above embodiment without departing from the spirit or essential features of the present disclosure. Accordingly, the description above is only a non-limiting example. The scope of the present disclosure is defined not by the description above, but by the appended claims. Among all possible modifications, the modifications within the range of equivalents are to be considered encompassed by the claims.

Figure 16A:
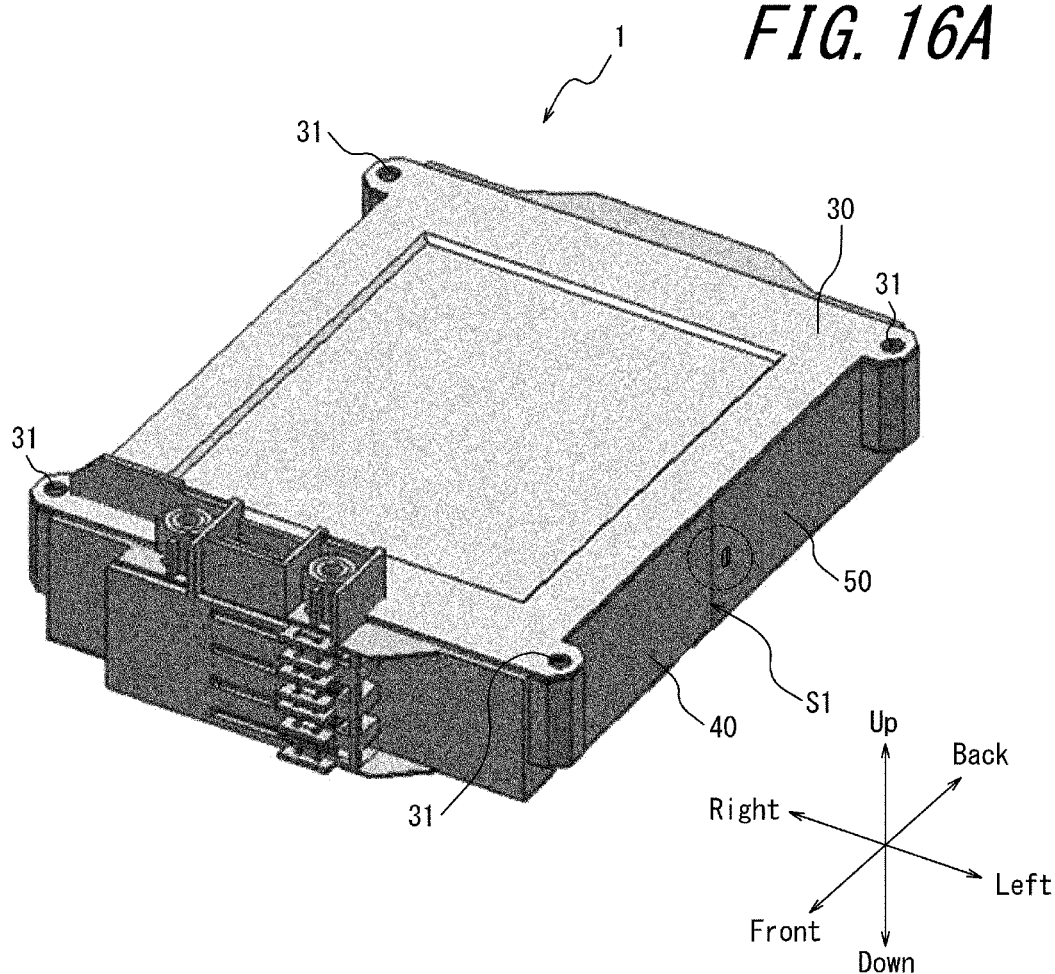
FIG. 16A illustrates a fitting portion of the first case and the second case.
Figure 16B:
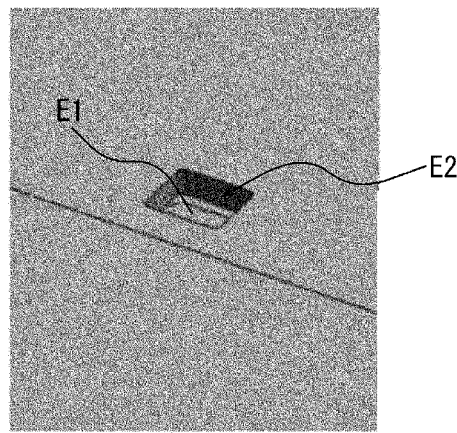
FIG. 16B illustrates an enlargement of the portion surrounded by a dashed line in FIG. 16A.

FIGS. 16A and 16B illustrate a fitting portion of the first case 40 and the second case 50. FIG. 16A is a perspective view illustrating the appearance of the battery pack 1. FIG. 16B illustrates an enlargement of the portion surrounded by a dashed line in FIG. 16A.

For example, the first case 40 and the second case 50 may be fit together with engaging claws E1 formed on the left and right side surfaces of one case and engaging holes E2 formed on the corresponding left and right side surfaces of the other case. In other words, the engaging claws E1 engage with the engaging holes E2 when the first case 40 and the second case 50 are fit together. The battery pack 1 is not limited to a configuration engaged by a claw and hole. For example, the first case 40 and the second case 50 may be fit together by arbitrary protrusions, which protrude from the respective left and right side surfaces, being clamped by an elastic member, such as a clip. The first case 40 and the second case 50 may be fit together by any fastening structure, such as screwing. In this way, the battery pack 1 may have any engaging structure that allows the first case 40 and the second case 50 to be fit together reliably. The battery pack 1 is therefore easy to assemble, which can contribute to improving product reliability.

The abutting portion 44 has been described as being provided only in the first case 40, but this example is not limiting. For example, the second case 50 may include an abutting portion. In this case, the abutting portion may be configured by at least one of the first inner wall 54$a$, the second inner wall 54$b$, and the third inner wall 54$c$. Both the first case 40 and the second case 50 may include an abutting portion.

The battery pack 1 need not include the tapered portions 45$a$ and 55$a$ as long as ease of insertion of the battery cells 10 into the first case 40 and the second case 50 can be secured.

The battery pack 1 is not limited to a configuration such that the guides 45 and 55 are independently provided. For example, the guides 45 and 55 may be omitted, and the battery pack 1 may be configured so that the first insulating portions 46$a$ and 56$a$ also serve as guides. In this case, the ease of insertion of the battery cells 10 can be improved by the first insulating portions 46a and 56a being provided with a tapered shape.

A restraining plate 30 may also be provided along with the opening O at the lower surface side of the battery cell assembly 100 in the battery pack 1. The battery cell assembly 100 is thereby sandwiched from both above and below by rigid restraining plates 30, further improving the pressure retention.

Similarly, an insulating sheet 20 may also be provided at the lower surface side of the battery cell assembly 100 in the battery pack 1. The electrical insulation in the battery pack 1 can thereby be further improved.

The number of battery cells 10 and the number of windows 42 and 52 are not limited to the above configurations. Any number of battery cells 10 may be included. The windows 42 and 52 may be provided in an appropriate form corresponding to the number of battery cells 10.

REFERENCE SIGNS LIST

1 Battery pack
10, 10a, 10b, 10c, 10d, 10e, 10f Battery cell
11 Outer surface
12p, 12n Electrode tab
13 Outer surface
14 Exterior member
20 Insulating sheet
30 Restraining plate
31 Hole
32 Recess
40 First case
40a Bottom surface
41 Screw hole
42, 42a, 42b, 42c, 42d Window
421, 421a, 421b, 421c, 421d Window
422, 422a, 422b, 422c Window
43 Pressing member insertion hole
44 Abutting portion
44a First inner wall (inner wall)
44b Second inner wall
44c Third inner wall
45 Guide
45a Tapered portion
46a First insulating portion
46b Second insulating portion
47, 47a, 47b, 47c, 47d Housing portion
471, 471a, 471b, 471c, 471d Housing portion
472, 472a, 472b, 472c Housing portion
50 Second case
51 Screw hole
52, 52a, 52b, 52c Window
53 Pressing member insertion hole (insertion hole)
54a First inner wall (inner wall)
54b Second inner wall
54c Third inner wall
55 Guide
55a Tapered portion
56a First insulating portion
56b Second insulating portion
57, 57a, 57b, 57c Housing portion
60a Total plus bus bar
60b Total minus bus bar
70a, 70b Pressing member
71a Recess
72, 73 Fixing clamp (fixing member)
74 Insulating cover (window housing portion)
80 Body
80a Bottom surface
81 Support
81a Screw hole
90 Discharge portion
91 Discharge tube
100 Battery cell assembly
E1 Engaging claw
E2 Engaging hole
F Fixing portion
O Opening
S1 Connection surface
S2 Tip surface

The invention claimed is:

1. A battery pack comprising:
a plurality of battery cells having electrode tabs protruding from an outer surface of an exterior member; and
a case housing the plurality of battery cells in a stacked state and supporting the exterior member of the battery cells in the stacked state;
wherein a welded portion is formed in the plurality of battery cells, the electrode tabs of adjacent battery cells being welded together in the welded portion by laser irradiation in a folded and overlapping state; and
wherein the case comprises:
a housing portion configured to house the electrode tabs of the battery cells inserted in a direction in which the electrode tabs protrude from the outer surface of the exterior member;
an inner wall of the housing portion configured to face a folded and overlapping portion of the electrode tabs and to restrict movement of the battery cells in the direction in which the electrode tabs protrude; and
a window configured to penetrate through the inner wall and expose the welded portion from the housing portion.

2. The battery pack of claim 1,
wherein the welded portion is provided for each connected pair of the battery cells; and
wherein the window is formed individually for each welded portion.

3. The battery pack of claim 1, wherein the window has a larger area than the welded portion.

4. The battery pack of claim 3, wherein the window has a smaller area than a folded and overlapping portion of the electrode tabs.

5. The battery pack of claim 1, wherein the case comprises an insertion hole through which a pressing member is inserted, the pressing member abutting a folded and overlapping portion of the electrode tabs against an inner wall of the case.

6. The battery pack of claim 5, wherein the insertion hole is formed in the case on a side surface intersecting a surface where the window is formed and exposes an inside of the housing portion from a side.

7. The battery pack of claim 5, further comprising a fixing member configured to fix the pressing member to the case.

8. The battery pack of claim 1, further comprising a window housing portion configured to cover the window.

9. The battery pack of claim 5, wherein the pressing member comprises a recess, at a position opposite the window, recessed towards an inside of the case.

10. The battery pack of claim 5, wherein the pressing member is made of metal or heat-resistant resin and is covered by an electrically insulating material.

11. The battery pack of claim 1,
wherein a tip bent to face the outer surface is formed on the electrode tab; and
wherein the tips of adjacent electrode tabs are bent in opposite directions.

12. The battery pack of claim 11, wherein at the folded and overlapping portion of the electrode tabs, the tip of the electrode tab disposed on one side in a stacking direction of the battery cells is positioned farther on the inner wall side than the tip of the electrode tab disposed on another side in the stacking direction.

* * * * *